(12) United States Patent
Gara et al.

(10) Patent No.: US 8,635,492 B2
(45) Date of Patent: Jan. 21, 2014

(54) STATE RECOVERY AND LOCKSTEP EXECUTION RESTART IN A SYSTEM WITH MULTIPROCESSOR PAIRING

(75) Inventors: Alan Gara, Mount Kisco, NY (US); Michael K. Gschwind, Chappaqua, NY (US); Valentina Salapura, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 13/027,932

(22) Filed: Feb. 15, 2011

(65) Prior Publication Data

US 2012/0210162 A1 Aug. 16, 2012

(51) Int. Cl.
*G06F 11/00* (2006.01)
(52) U.S. Cl.
USPC .......................................................... 714/11
(58) Field of Classification Search
USPC .......... 714/4.11, 4.12, 5.11, 10–24, 26–31, 41
See application file for complete search history.

(56) References Cited

U.S. PATENT DOCUMENTS

| | | | | |
|---|---|---|---|---|
| 5,388,215 | A | * | 2/1995 | Baker et al. .................... 709/229 |
| 5,745,672 | A | * | 4/1998 | Stiffler .......................... 714/6.12 |
| 5,751,955 | A | * | 5/1998 | Sonnier et al. .................. 714/12 |
| 5,964,835 | A | * | 10/1999 | Fowler et al. ................. 709/216 |
| 5,970,226 | A | * | 10/1999 | Hoy et al. ....................... 714/25 |
| 6,141,770 | A | | 10/2000 | Fuchs et al. |
| 6,393,582 | B1 | | 5/2002 | Klecka et al. |
| 6,772,368 | B2 | | 8/2004 | Dhong et al. |
| 6,862,693 | B2 | | 3/2005 | Chaudhry et al. |
| 6,948,092 | B2 | | 9/2005 | Kondo et al. |

(Continued)

FOREIGN PATENT DOCUMENTS

| | | |
|---|---|---|
| GB | 2425380 B | 9/2009 |
| JP | 58-056062 | 4/1983 |

(Continued)

OTHER PUBLICATIONS

Siewiorek, et al., "C.vmp: The Analysis, Architecture and Implementation of a Fault Tolerant Multiprocessor", IP.com, IPCOM000148040D, Original publication date: Dec. 31, 1976, IP.com Eletronic publication date: Mar. 28, 2007, Database entry Copyright (c) Software Patent Institute.

(Continued)

*Primary Examiner* — Nadeem Iqbal
(74) *Attorney, Agent, or Firm* — Scully, Scott, Murphy & Presser, P.C.; Daniel P. Morris, Esq.

(57) ABSTRACT

System, method and computer program product for a multi-processing system to offer selective pairing of processor cores for increased processing reliability. A selective pairing facility is provided that selectively connects, i.e., pairs, multiple microprocessor or processor cores to provide one highly reliable thread (or thread group). Each paired microprocessor or processor cores that provide one highly reliable thread for high-reliability connect with a system components such as a memory "nest" (or memory hierarchy), an optional system controller, and optional interrupt controller, optional I/O or peripheral devices, etc. The memory nest is attached to a selective pairing facility via a switch or a bus. Each selectively paired processor core is includes a transactional execution facility, wherein the system is configured to enable processor rollback to a previous state and reinitialize lockstep execution in order to recover from an incorrect execution when an incorrect execution has been detected by the selective pairing facility.

13 Claims, 18 Drawing Sheets

(56) References Cited

U.S. PATENT DOCUMENTS

| | | | |
|---|---|---|---|
| 7,058,855 B2 | 6/2006 | Rohfleisch et al. | |
| 7,065,672 B2 | 6/2006 | Long et al. | |
| 7,155,721 B2 | 12/2006 | Safford et al. | |
| 7,287,185 B2 | 10/2007 | Safford et al. | |
| 7,290,169 B2 | 10/2007 | Safford et al. | |
| 7,328,371 B1* | 2/2008 | Kalyanasundharam et al. | 714/11 |
| 7,343,436 B2 | 3/2008 | Atago | |
| 7,398,419 B2 | 7/2008 | Safford et al. | |
| 7,426,614 B2 | 9/2008 | Bruckert et al. | |
| 7,526,442 B2 | 4/2009 | Edgar et al. | |
| 7,613,948 B2 | 11/2009 | Hillman et al. | |
| 7,669,079 B2* | 2/2010 | Weiberle et al. | 714/10 |
| 8,051,323 B2* | 11/2011 | Pathirane et al. | 714/10 |
| 2002/0144177 A1 | 10/2002 | Kondo et al. | |
| 2005/0197718 A1 | 9/2005 | Shin et al. | |
| 2005/0223178 A1* | 10/2005 | Garcia et al. | 711/150 |
| 2005/0240806 A1* | 10/2005 | Bruckert et al. | 714/6 |
| 2006/0242645 A1 | 10/2006 | Codrescu et al. | |
| 2007/0061812 A1 | 3/2007 | Safford et al. | |
| 2010/0042871 A1 | 2/2010 | Wendorff et al. | |

FOREIGN PATENT DOCUMENTS

| | | |
|---|---|---|
| JP | 09-160793 | 6/1997 |
| JP | 2006-058984 | 3/2006 |
| JP | 2009098988 A2 | 5/2009 |

OTHER PUBLICATIONS

Chiu et al., "A Genetic Algorithm for Reliability-Oriented Task Assignment with k Duplications in Distributed System", IEEE Transactions on Reliability, vol. 55, No. 1, Mar. 2006, pp. 105-117.

Hammond et al., "The Stanford Hydra CMP", IEEE Mar.-Apr. 2000, pp. 71-84.

Hammond et al., "Transactional memory coherence and consistency", Proceedings of the 31st annual International Symposium on Computer Architecture (ISCA), pp. 102-113, 2004.

Herlihy et al., "Transactional memory: Architectural support for lock-free data structures", Proceedings of teh 20th International Symposium on Computer Architecture (ISCA), pp. 289-300, 1993.

Office Action dated May 1, 2013, received in a related U.S. Appl. No. 13/027,882.

* cited by examiner

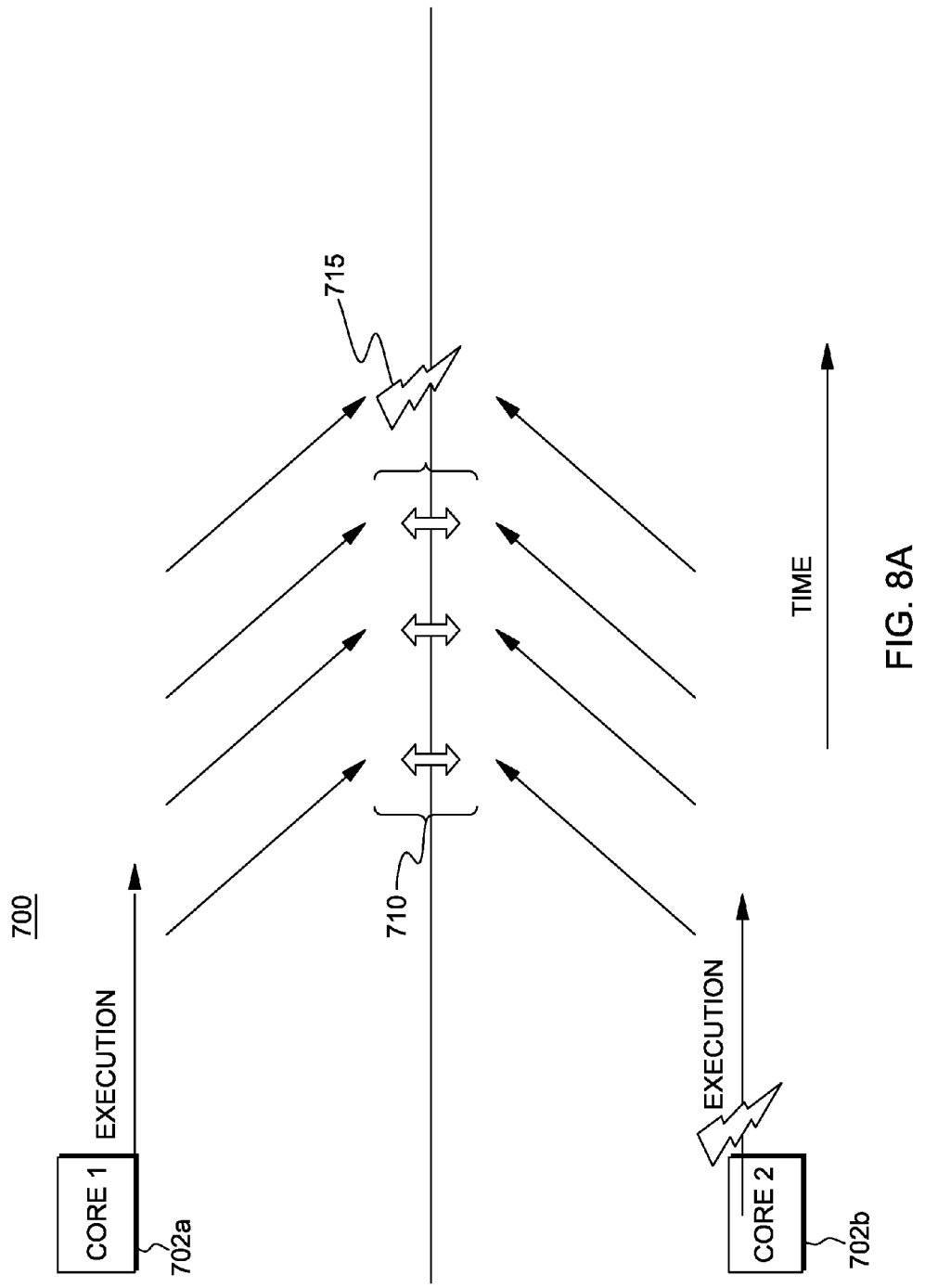

STATE RECOVERY AND LOCKSTEP EXECUTION RESTART IN A SYSTEM WITH MULTIPROCESSOR PAIRING

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. B554331 awarded by the United States Department of Energy.

CROSS-REFERENCE TO RELATED APPLICATIONS

This disclosure relates and incorporates by references commonly-owned, co-pending U.S. patent application Ser. Nos. 12/027,882 and 13/027,960 the entire contents and disclosures of which are incorporated by reference as if fully set forth herein.

The present invention relates generally to fault tolerant multi-processor computing systems and particularly to a novel system and method for highly-reliable mode of computing operations. More particularly, there is provided a system and method that includes a chip multiprocessor with processor core pairing facility in order to enable an information handling system to offer both high reliability and high performance operation modes, and providing in the system the ability to recover on failed lockstep execution, and to restart execution.

BACKGROUND

Some multiprocessor systems exist today that have been designed to offer increased reliability using paired microprocessor cores. An exemplary system is described by Timothy J. Slegel et al. IBM'S S/390 G5 MICROPROCESSOR DESIGN, IEEE MICRO, March 1999, which has been used to achieve industry-leading reliability. However, this prior art design is based on an approach that completely duplicates an I (Instruction) unit and E (Execution) unit of the core. That is, on every clock cycle, signals coming from these units, including instruction results, are cross-compared in a R (Reliability) unit and the L1 cache. If the signals don't match, hardware error recovery is invoked. This checking scheme solves the problems associated with traditional checking, although at an additional cost in die area.

The R unit and L1 cache use traditional error-checking approaches. All arrays in a L1 cache unit are protected with parity except for the store buffers, which are protected with ECC. Since the L1 is a store-through design, another valid copy of the data will always be in L2 or in memory. As an aside, since the L2 is a store-in design, it is protected by ECC, because it often holds the only valid copy of data. If the R unit or L1 cache detects an error, the processor automatically enters an error recovery mode of operation. This process is done purely in hardware without any millicode intervention, since the processor may be in some indeterminate state that may not be able to run millicode. This error recovery mode also lets the processor recover while it is executing in millicode.

While this design approach has offered high reliability, the duplicated resources were not available even when high reliability was not required. However, some classes of applications offer natural resilience, and it is advantageous to enable systems with higher performance when executing such algorithms. Examples of such algorithms are digital content creation and graphics processing, where deviations from the numerically correct results are not noticed by viewers; and convergence-based algorithms, wherein a corrupted numeric value may increase the runtime, but not impact final result correctness.

Thus, for example, a soft error occurring at a low-order mantissa bit may cause one or two additional iterations to be performed, but making twice the number of cores available to the application will result in an overall speedup.

A single system may be used to execute resilient programs (e.g., financial forecasting and simulation), and those requiring high accuracy (e.g., financial transactions), either simultaneously, or at different times. A single application may also consist of components requiring high reliability, and those being naturally resilient.

FIG. 1 shows a prior art multiprocessor system 10 including multiple processor cores 12a, . . . , 12n (such as embedded on a single chip or system on Chip (SoC) interfaced with system components 14 comprising, for example, memory nest, interrupt controller, etc. Each core 12a, . . . , 12n communicates with system components, e.g., by receiving respective input signals 20a, . . . , 20n, and sending output signals 25a, . . . , 25n.

A prior art multiprocessor system described in U.S. Pat. No. 7,065,672 entitled "Apparatus and methods for fault-tolerant computing using a Switching Fabric" describes a computer system having a switching fabric that communicates transactions asynchronously between data processing elements and a target processor. While this application describes a method for determining correct execution, voting is performed between a plurality of processors, the processors are not to be independently used, and are not shown to be independently usable for lack of switching fabric access. Furthermore, this prior art configuration is dependent upon the features of asynchronous switching networks and the operation of peripheral devices.

Current fault-tolerant systems do not enable both processors to provide independent operation when computational processes are naturally resilient, nor do they enable pairwise execution and checking when they are not.

Moreover, in the art, lockstep execution has been used to detect an execution failure. However, there exists no adequate recovery solution, nor a solution that implements a method to retry the execution.

It would be highly desirable to provide a system and method that provides a pairing facility that enables selective pairing of microprocessors for high reliable (fault-tolerant) implementations under software control.

It would be further highly desirable to provide a system and method that provides a pairing facility that enables dynamic configuration of selectively paired microprocessors, and provides in the system the ability to recover on failed lockstep execution, and to restart execution.

SUMMARY

There is provided a system, method and computer program product for a multiprocessing system that offers selective pairing of processor cores for increased processing reliability. In this aspect, the system includes a switch to selectively pair cores to provide one highly reliable thread (or thread group) or independently operate two cores to provide two independent threads (thread groups). Software is provided to schedule a highly reliable thread on the pairable set of cores. Each processor core is adapted for lockstep execution, wherein the system is configured to enable processor rollback to a previous state and reinitialize lockstep execution.

In one aspect there are provided methods and an apparatus for configuring a system to use either processor cores as independent cores to offer higher overall system performance or for paired execution of microprocessor cores wherein a single program is executed twice and results are compared for increased reliability wherein, the processor cores are adapted for lockstep execution, and the system configurable to enable processor rollback to a previous state and reinitialize lockstep execution.

Accordingly, there is provided a multiprocessing computer system comprising: a transactional memory system including a memory storage device; at least two processor cores in communication with the transactional memory system; a pairing sub-system adapted to pair at least two of the at least two processor cores for fault tolerant operations of a current transaction in response to receipt of configuration information signals, the pairing sub-system providing a common signal path for forwarding identical input data signals to each the paired two processor cores for simultaneous pairwise processing thereat, the pairwise processing performing a lock-step execution of the transaction, the transactional memory storage device adapted to store error-free transaction state information used in configuring each paired core the pairing sub-system for the simultaneous pairwise processing; decision logic device, in the pairing sub-system, for receiving transaction output results of each the paired two processor cores and comparing respective output results, the decision logic device generating an error-free indication signal upon determining matching transaction output results of the paired two processor cores when performing the lock-step execution; and, a control processor device, responsive to the error-free indication signal, for updating the transactional memory storage device with transaction state information associated with a most recent error-free transaction In a further aspect there is provided a method for performing highly-reliable fault tolerant operations in a multiprocessing computing system including at least two processor cores in communication with a memory system, the method comprising: dynamically configuring a pairing sub-system adapted to pair at least two of the at least two processor cores for fault tolerant operations of a current transaction in response to receipt of configuration information signals, the pairing sub-system providing a common signal path for forwarding identical input data signals to each the paired two processor cores for simultaneous pairwise processing thereat, the pairwise processing including performing a lock-step execution of the transaction, storing, in a transactional memory system including a memory storage device, error-free transaction state information used in configuring each paired core the pairing sub-system for the simultaneous pairwise processing; receiving, at a decision logic device in the pairing sub-system, transaction output results of each the paired two processor cores; comparing respective transaction output results, generating, by the decision logic device, an error-free indication signal upon determining matching transaction output results of the paired two processor cores when performing the lock-step execution; and, updating, responsive to receipt of the error-free indication signal, the transactional memory storage device with transaction state information associated with a most-recent error-free transaction.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which:

FIG. 8A depicts a transaction 700 in which each of selected paired cores perform lock-step execution of a transaction, with write outputs being stored (saved) in a memory storage device or buffer;

DETAILED DESCRIPTION

In one aspect, there is provided a selective pairing facility that selectively connects, i.e., pairs, multiple microprocessor or processor cores to provide one highly reliable thread (or thread group). Each paired microprocessors or processor cores that provide one highly reliable thread for high-reliability connect with a system components such as the "memory nest" (or memory hierarchy), an optional system controller, and optional interrupt controller, optional I/O or peripheral devices, etc. The memory nest is attached to a selective pairing facility via a switch or a bus.

For purposes of description, a thread is understood as a single thread of control, represented by a set of architected processor state resources and including a current instruction address. A thread group is a plurality of threads, each thread represented by a set of architected processor state resources and including a current instruction address. According to one embodiment, using selective pairing on a microprocessor executing a single thread of control will yield a single, more reliable thread. Using selective pairing on a microprocessor executing multiple threads of control (wherein the same threads are replicated on the paired cores) will yield a group of reliable threads that are simultaneously being paired and executed redundantly. Pairing may be used on a group of threads in a multi-threaded core to achieve a reliable multi-threading core.

In one aspect, the apparatus implements a method and computer program product including instructions executed by a host or processor system for configuring two hardware cores as a single highly reliable core using the selective pairing facility, and further, to deconfigure a highly reliable core into two separate cores. Further, the method includes scheduling an application, or a portion thereof, to a highly reliable core responsive to an indication that said application (or application portion) should be executed on a reliable core. Likewise, the method and computer program product including executable instructions may further schedule an application, or portion thereof, to a single unreplicated core responsive to an indication that said application (or application portion) is resilient.

Figure 1:
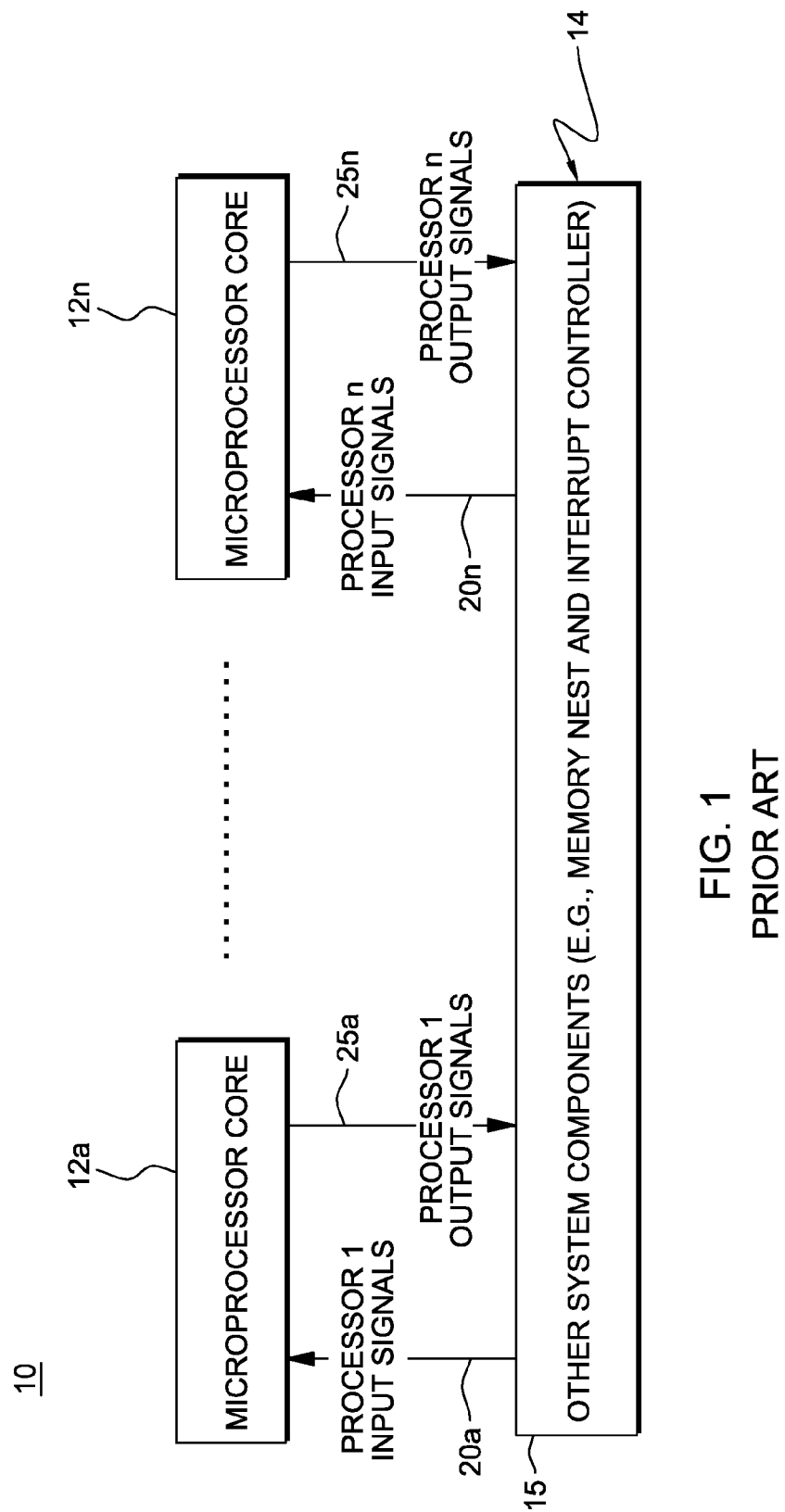
FIG. 1 an example prior art dual processor system interfaced with system components.
Figure 2:
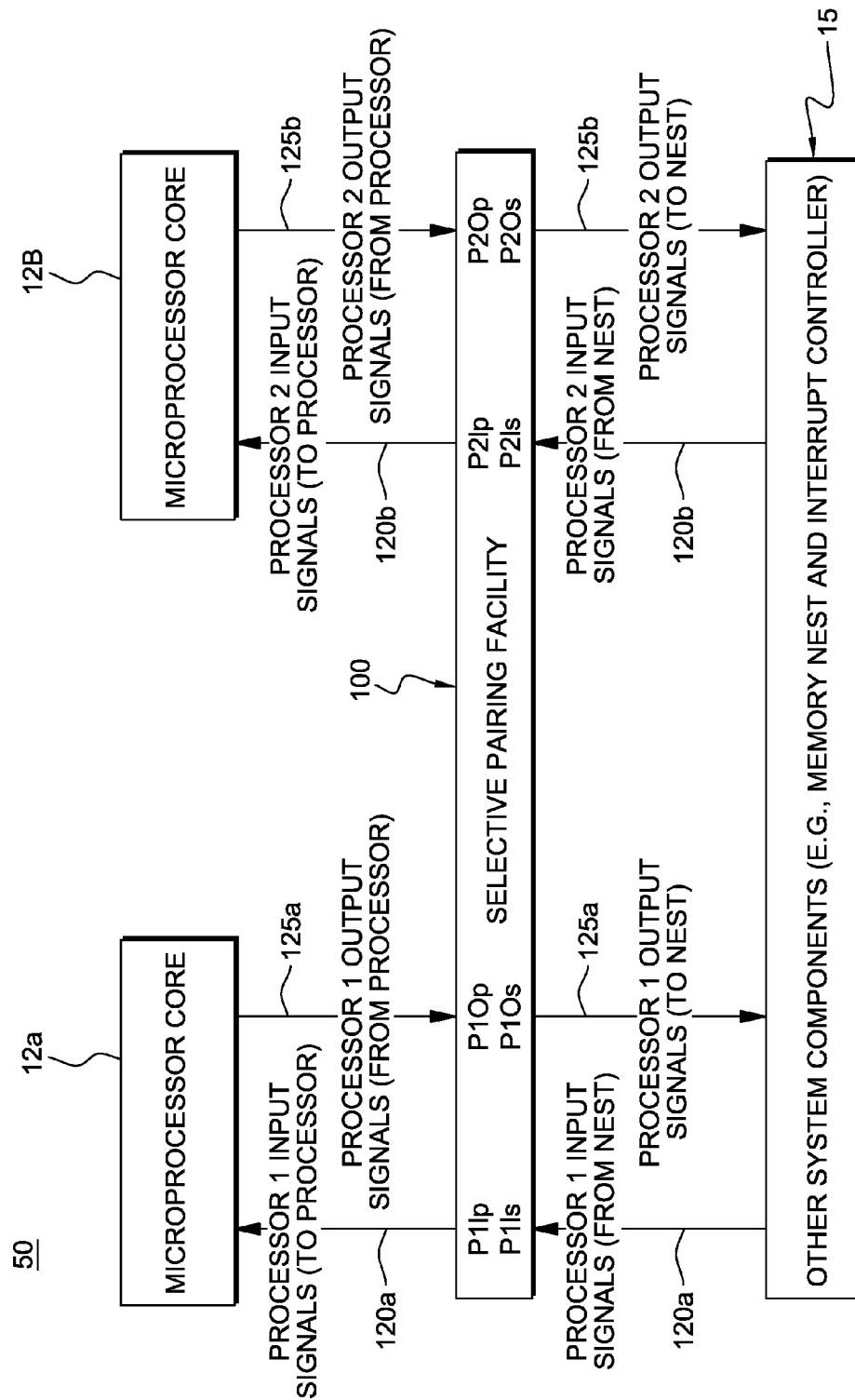
FIG. 2 depicts the system and method for selective pairing of microprocessor cores in accordance with one embodiment.

FIG. 2 depicts the system and method for selective pairing of microprocessor cores in accordance with one embodiment. Particularly, FIG. 2 depicts a highly-reliable computing system 50 that includes a selective pairing facility 100 shown interfaced to and connecting exemplary two processor cores 12a, 12b with a system interconnect 15 to connect to system components such as system memory, e.g., memory "nest". In one embodiment, each core 12a, 12b communicates with the system interconnect 15 via respective input/output signal conductors through the pairing facility 100. For example, input signals are provided over conductor 120a from a system interconnect to a processor core 12a via a configured pairing facility 100 and processor/core output signals are provided over conductor 125a from processor core 12a to the system interconnect 15 via a configured pairing facility 100. Likewise, input signals are provided over conductor 120b from a system interconnect to processor core 12b via a configured pairing facility 100 and processor output signals are provided over conductor 125b from processor core 12b to the system interconnect 15 via a configured pairing facility 100.

In the manner as will be explained in greater detail herein below, the selective pairing facility 100 includes a switching system and intelligence that is embedded or otherwise integrated within a crossbar switch or like switching system, for real-time connecting pairs of microprocessor for highly-reliable operations. In one example, commands for configuring the selective pairing facility for connecting pairs of microprocessor for highly-reliable operations are provided in real-time, during a program execution.

Figure 3A:
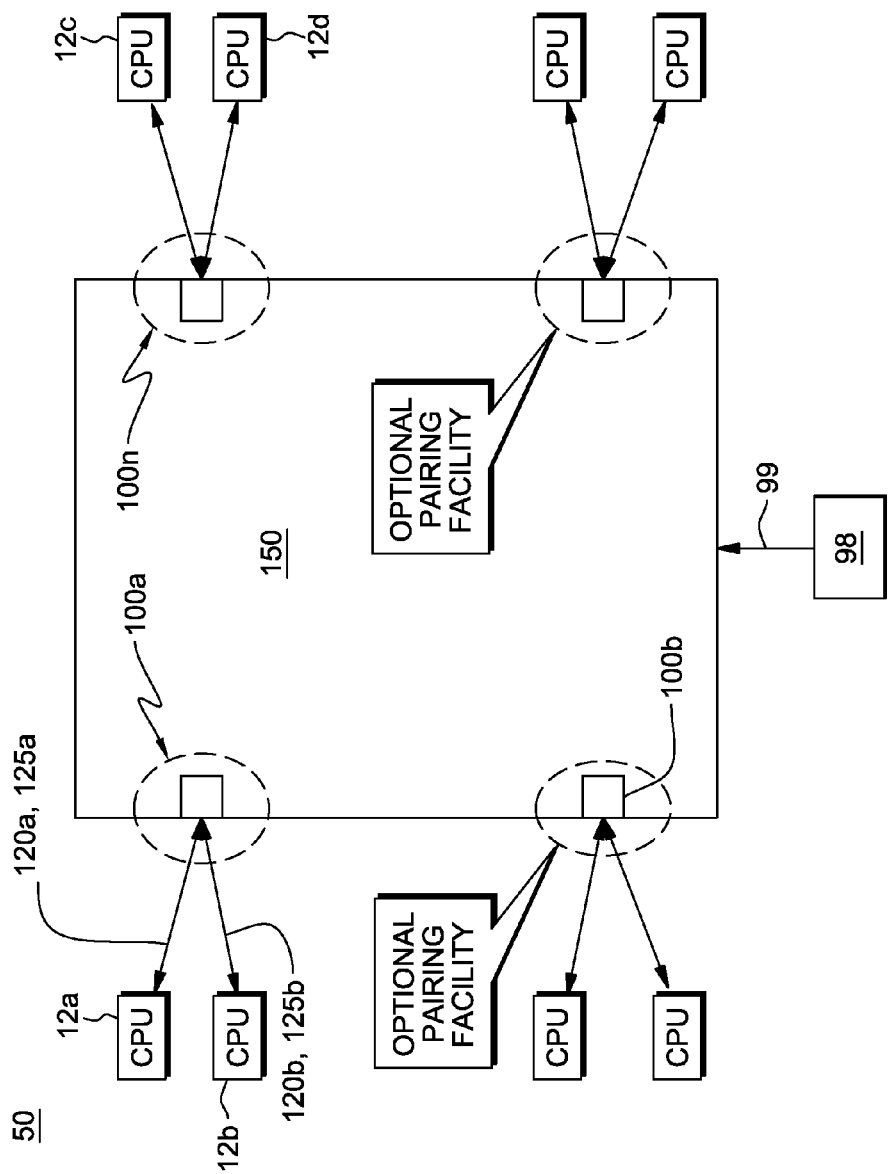
FIGS. 3A and 3B depict several pairing facilities 100a, 100b, . . . , 100n configurable within a switching system, which, in one embodiment, includes a crossbar switch 150 as shown in FIG. 3A, or, bus device 175 as shown in FIG. 3B, according to alternate embodiments.
Figure 3B:
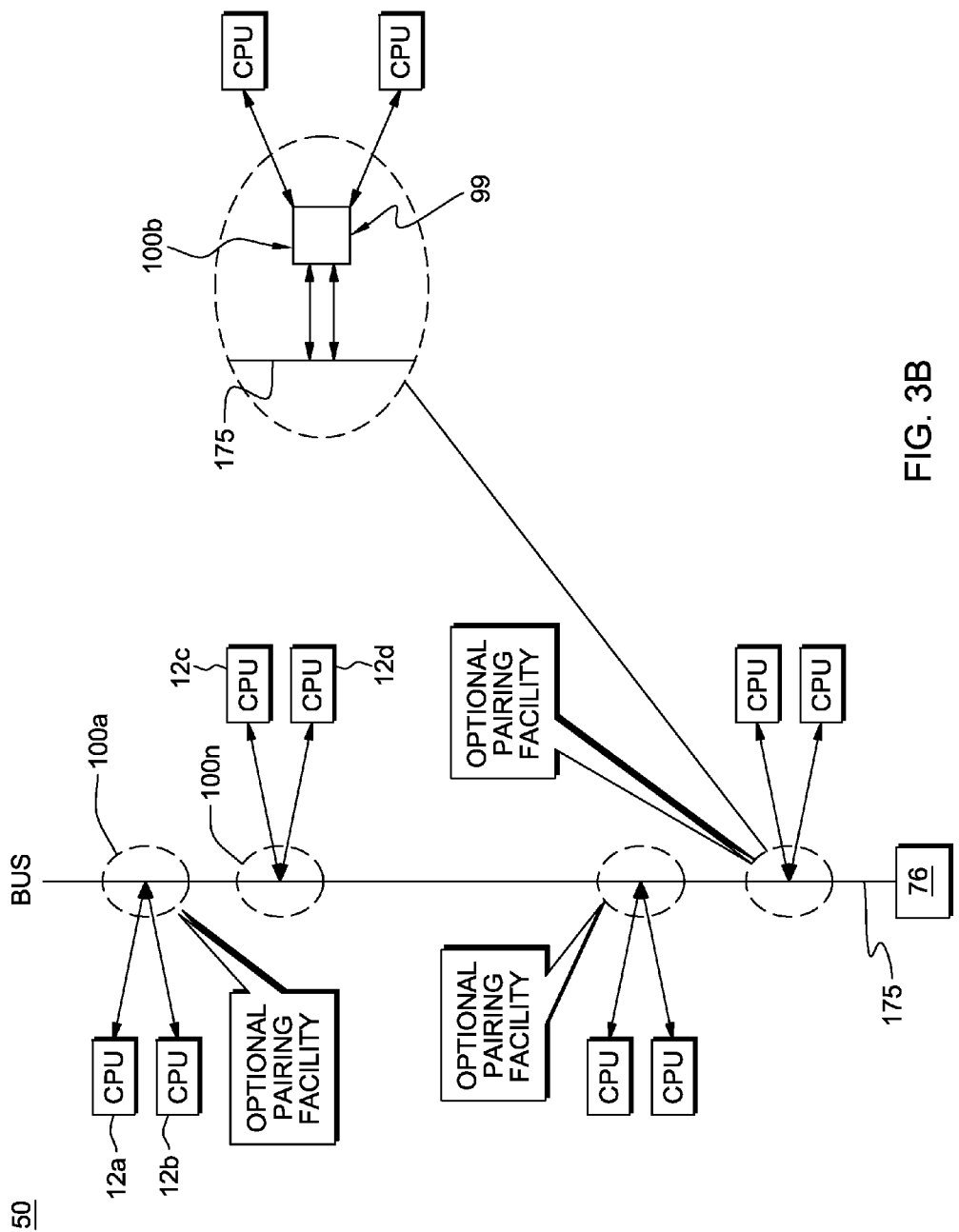

For example, as shown in FIGS. 3A and 3B, several pairing facilities 100a, 100b, . . . , 100n are configurable within a switching system, which, in one embodiment, includes a crossbar switch 150 as shown in FIG. 3A, or, as shown in FIG. 3B, a bus device 175, that enables highly-reliable operations for two or more microprocessor cores that are paired via the pairing facility in response to selective pairing instruction signals 99. Thus, in accordance with one embodiment, responsive to receipt of a selective pairing instruction signal 99 executed via a separately running program application (or application part) or program application running at one of the processor cores to be paired, a selective pairing facility 100a, 100b, . . . , 100n, etc. can be configured for pairing the two processor cores, e.g., to run as a highly-reliable single thread. For example, in FIG. 3A, signal 99, such as a configuration signal generated from an Operating System (O/S), a scheduler 98, user program, control program and/or programmed configuration registers (not shown), initiates the hardware configuration of a pairing facility 100a for pairing, in real-time, example processor cores 12a, 12b within switching system 150 and/or initiates hardware configuration of pairing facility 100n for pairing, in real-time, example processor cores 12c, 12d within switching system 150. Likewise, in the embodiment depicted in FIG. 3B, selective pairing configuration signal 99 may be input to a selected pairing facility, e.g., 100a, to configure a pairing facility 100a within bus switching system 175 for pairing, in real-time, example processor cores 12a, 12b, and a pairing facility 100n for pairing, in real-time, example processor cores 12c, 12d. A single pairing facility 100b shown enlarged within dotted circle in the embodiment depicted in FIG. 3B provides two sets of conductors, one set for interfacing between the CPUs and the facility and one set for interfacing between the facility and the bus 175 and is shown receiving selective pairing configuration signal 99, e.g., from a scheduler 76. It is understood that one or more pairing facilities 100a, 100b, . . . , 100n for enabling highly-reliable processor core operations is configurable during a single program execution.

Figure 3C:
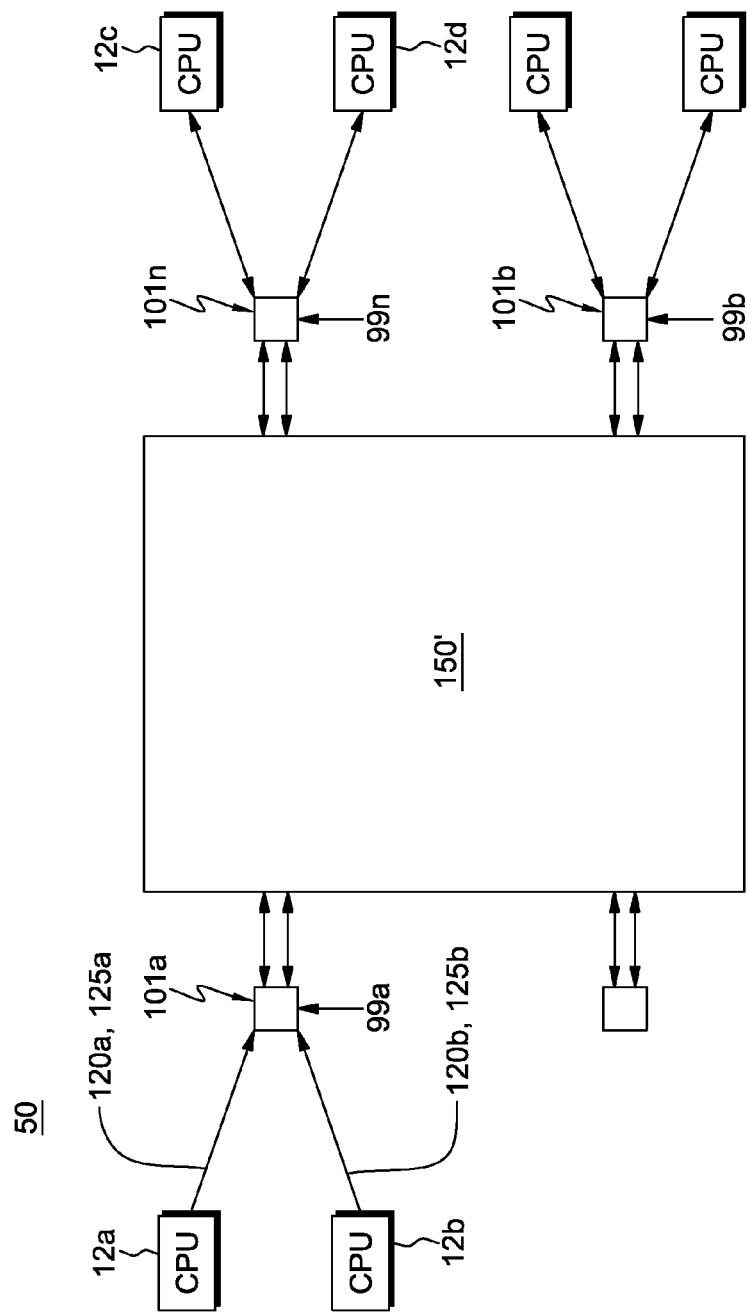
FIG. 3C depicts an alternative embodiment implementing a switch 150' configured to interface with a plurality of external interfacing selective pairing facility hardware modules in one embodiment.

As an alternative embodiment to the embodiment implementing a crossbar switch 150 such as shown in FIG. 3A wherein selective microprocessor pairing is accomplished via facilities 100a, 100b, etc. internal to the switch 150, a crossbar switch 150' such as shown in FIG. 3C, is configured to have a plurality of external interfacing selective pairing facility hardware modules 101a, 101b, . . . , 101n that interface with the switch to receive configuration signals 99 in addition to wired input/output signals from the selected pairs of microprocessors, e.g., 12a, 12b or 12c, 12d, etc. A single pairing facility 101a shown in the embodiment depicted in FIG. 3C includes two sets of conductors 120a, 125a and 120b, 125b, one set for interfacing between each CPU and the facility and one set for interfacing between the facility and the switch 150'.

It is understood that configuration signals 99 received at the selective pairing facilities includes those configuration and control signals such as generated by the operating system (O/S), including signals from a scheduler component 76, 98 for allocating processing threads on a single or paired cores as described herein, and which includes configuration registers populated with data from the user program whether for a single processor core or paired processor cores for running high reliability mode operations. Each pairing facility 101a to 101n in FIG. 3C receives its own configuration signal 99a . . . 99n to be configured independently In the embodiments depicted, the system 50 is designed for operation with a variable number of cores 12a, . . . , 12n. Thus, for example, a system with an amount "2n" hardware cores in a design can make available an amount "n" selected pair cores, and 2n cores to be assigned to software. When a system has an amount "n" cores available, all cores have been paired for increased reliability resulting in the software being able to use n highly reliable cores. When a system has 2n cores, and no cores have been paired, this results in 2n cores being available for applications with high performance needs. In a system which has a number of cores between n and 2n cores being available to software corresponds to a system wherein some cores have been made highly reliable to execute applications (or application parts) requiring high reliability, whereas another set of cores is available to execute other applications (or application parts) requiring higher performance and being more inherently reliable.

In another aspect of the present invention, each of the selected microprocessor core pairs, e.g., 12a, 12b or 12c, 12d can be heterogeneous, and are selected to accommodate a particular type of high-reliability processing. Thus, for example, if certain processing speed, registers, check or memory considerations are required, certain processor cores, e.g., 12a, 12b may be the best fit for that calculation, and these processor cores may be paired that are better adapted for handling these particular types of high-reliability processing operations. The processors which can be paired are fixed, and if reliable processing is needed, but one of the cores is not available, OS or scheduler will intervene. The configuration signal 99 includes a trigger received at the switch to identify the particular microprocessors known to accommodate a particular type of high-reliability processing and the pairing facility 100 will respond by configuring the switch 150, 175 to configure a selected pair facility, e.g., 100a, for handling the requested type of high-reliability (e.g., single thread) processing at the requested microprocessors.

Figure 4A:
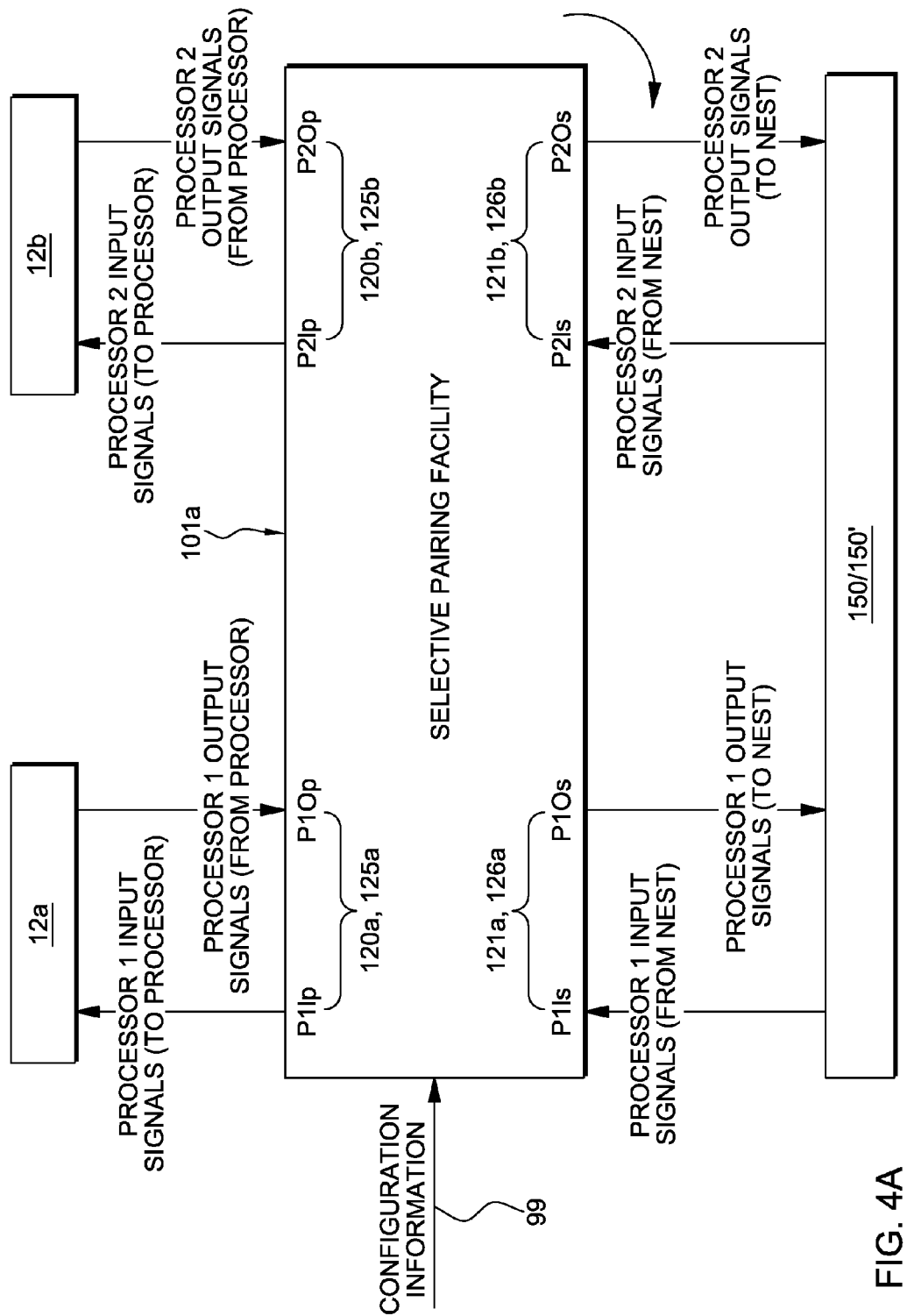
FIG. 4A depicts an example pairing facility 101a connecting to at least two processor cores 12a, 12b.

More particularly, with respect to the configuration of pairing facilities 100a, 100b, etc. shown in FIGS. 3A, 3B or pairing facilities 101a, 101b, etc. shown in FIG. 3C several architectures are embodied. For example, as shown in FIG. 4A, a pairing facility 101a connects to at least two cores 12a, 12b, the pairing facility having as inputs the respective output signals from the respective cores (herein referred to as P1Op and P2Op) that correspond to signals 125a, 125b being transmitted output from a respective microprocessor core to other system components (the "memory nest") via the switch 150/150'. Pairing facility 101a also connects to at least two cores 12a, 12b, the pairing facility having as outputs the respective input signals 120a, 120b to the input signals of the respective cores (P1Ip and P2Ip) that correspond to signals being received by a microprocessor core from other system components. In addition, the pairing facility 101a also includes outputs to the other system components via the switch 150/150' corresponding to the outputs of the processor cores 126a, 126b (P1Os and P2Os), and includes inputs 121a, 121b (P1Is and P2Is) from the other system components via switch 150/150' corresponding to the inputs of processor cores 12a, 12b respectively. In addition, the selective pairing facility has configuration inputs and diagnostic outputs, allowing management of selective pairing.

Figure 4B:
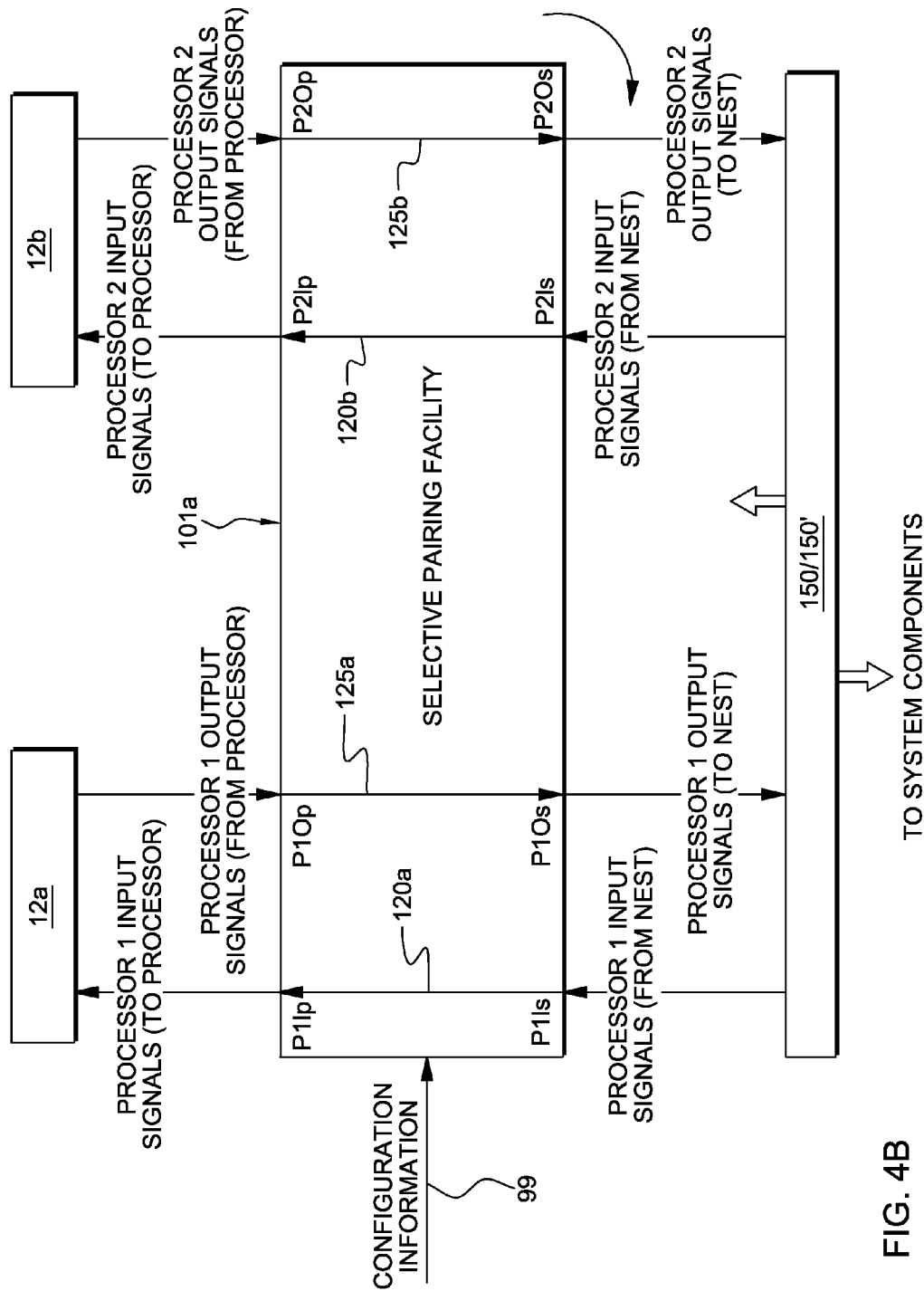
FIG. 4B depicts an example pairing facility 101a connecting to at least two processor cores 12a, 12b wired for individual (non-paired mode of operation)

In one aspect, each pairing facility 100a, 100b, . . . , 101a, 101b, etc. has two modes of operation—in a first high performance mode of operation, depicted in FIG. 4B, the system is configured such as to "pass thru" the signals from both cores. In this first operation mode, the operational paths are to independently connect the inputs of each core, e.g., microprocessor cores 12a, 12b to the corresponding system (e.g., memory nest, I/O controller, etc.) interfaces (not shown) via switch 150/150', making both processor cores independently available to software. That is, in response to configuration information 99 such as from an Operating System (O/S), a scheduler, user program, control program and/or programmed configuration registers (not shown) indicating a first mode of operation, the facility 101a, is configured as shown in FIG. 4B for independent processor core operation where processor core 12a communicates with the system components (not shown) via the switch 150/150' via signal line 120a connecting P1Is to processor core input P1Ip, and signal line 125a connecting processor core output P1Op to the system input at P1Os; and, is configured for independent processor core operation as shown in FIG. 4B where processor core 12b communicates with the system components (not shown) via the switch 150/150' via signal line 120b connecting P2Is to processor core input P2Ip, and signal line 125b connecting processor core output P2Op to the system input at P2Os. It is understood that signal lines 120a, 120b and 125a, 125b includes a variety of conductive structures as would be found in a single or multiprocessing system including, but not limited to: a bus which may comprises one or more busses in serial or parallel configurations, e.g., data busses, address busses, a system bus, an I/O bus, and a PCI bus, bus controllers, control signal and interrupt signal lines, etc.

Figure 4C:
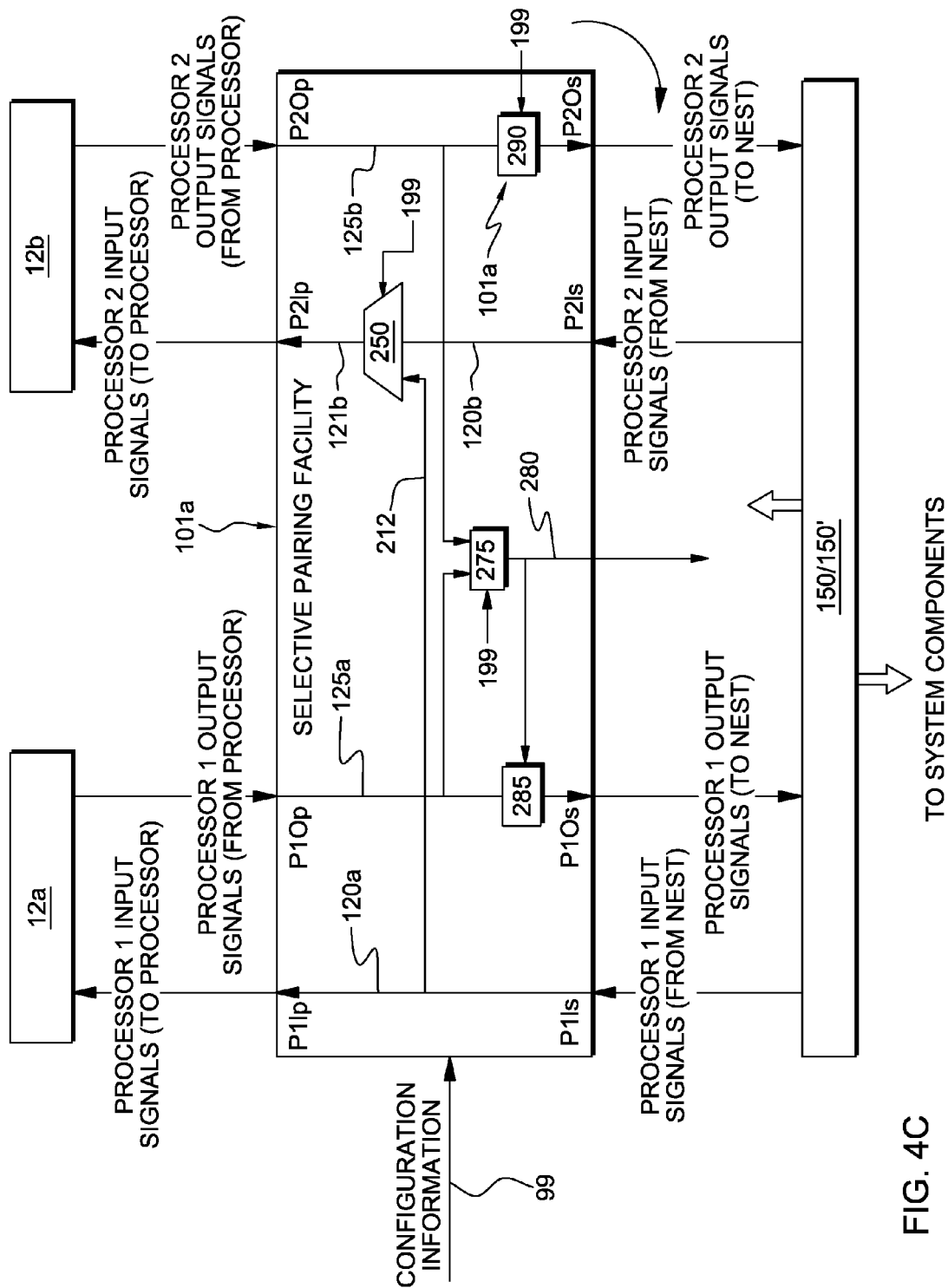
FIG. 4C depicts an example pairing facility 101a connecting at least two processor cores 12a, 12b wired for highly reliable paired mode of operation according to one embodiment.

In the second, high reliability mode of operation, as depicted in FIG. 4C, at least one core 12b is configured to check the execution of its paired core 12a, which connects to the system nest (not shown) via the switch 150/150'. As shown in FIG. 4C, the checker core 12b is not connected to the system components (not shown) via the switch 150/150' in this mode, but rather receives the same inputs as the checked core 12a, and its outputs are compared by comparison logic 275 with the output of the checked core. Thus, as shown in FIG. 4C, via signal line 120a from a system component to a processor core 12a, signals communicated over port P1Is and destined for input to processor core 12a via a configured pairing facility, e.g., 101a, are simultaneously provided as an input to processor core 12b for highly reliable operations. In one embodiment of the paired mode depicted in FIG. 4C, a configuration signal 199 indicating the paired mode of operation, is input to a multiplexor ("Mux") element 250 to configure the mux 250 to receive and select (pass through) only the input signal(s) 212 for input via port P2Ip to the processor/core 12b provided over mux output conductor 121b. Thus, in the paired mode, processor cores 12a and 12b both receive identical input signals carried on signals line 120a and 121b and may comprise one or more address, data, system, control, I/O, instruction or interrupt signals. Further, in the second paired mode of operation, both outputs of each processor core carried on signals lines (busses) 125a, 125b are compared for high-reliable operation. Thus, in the paired mode of operation as shown in the configured pairing facility of FIG. 4C, outputs of the processor 12a via port P1Op and signal line 125a are input to a decision logic device 275, e.g., a comparator; and, likewise, outputs of the processor 12b via port P2Op and signal line 125b are input to a decision logic device 275 that compares the respective processing core outputs. Depending upon the comparison results, an output of the comparator may indicate an error (result mismatch) via signal line 280, or provide an error-free indication, e.g., either by the absence of an error indication on signal line 280, or using an additional distinct signal line.

Further, output enable logic blocks 285 and 290 are provided to control the output signals P1Os and P2Os of respective processor 1 and processor 2 devices to the switch 150/150'. The output enable logic 290 controls and enables the processor output signals P2Op to be transmitted as P2Os signals to the switch 150/150'. The controlling signal is the configuration signal 199 indicating the paired mode of operation. In the paired mode of operation, the signal P2Op is disabled, and not driven to the P2Os signal. Similarly, the output enable logic 285 controls and enables the output signals P1Op to be transmitted as P1Os signals to the switch 150/150'. The controlling signal for this output enable logic 285 is the error signal 280 indicating that the results from the paired processors do not match, and that error happened, and no results should be sent into the switch 150/150' to system components.

Those skilled in the art will understand that "not driven" refers to not presenting requests received as signal P2Op as output P2Os, and indicating an absence of requests or transactions. The signaling protocol is dependent upon a specific implementation, and "not driven" may be implemented by a number of signaling means, including driving one or more signals to a high impedance value, or to a value or combination of values representing the absence of requests.

In accordance with the checking facility, the behavior of the pairing function and including the checking facility to implement a configured first mode or second mode of operation of the pairing facility such as configured facility 101a of FIG. 4B may be implemented by the following example VHDL pseudocode as follows where checker is processor 12b and checkee the processor 12a:

```
If (mode = passthru)
    P1Ip <= P1Is;
    P1Os <= P1Op;
    P2Ip <= P2Is;
    P2Os <= P2Op;
Else - (mode == paired)
    P1Ip <= P1Is;
    P1Os <= P1Op;
    P2Ip <= P1Is;
    Correct_execution <= (P1Op = P2Op); -- compare output of checker
    and checkee
End if;
```

Those skilled in the art will understand that at one time, more than two (2) cores can be paired, wherein two (2) cores may receive identical inputs as the checkee core and used as checker cores. Further, in one alternate embodiment, when more than two (2) cores are attached to a pairing facility, voting can be used to determine the output when executing in paired mode.

In another aspect, system software is provided that enables a computing machine to perform the function of: 1) configuring two hardware cores as a single highly reliable cores; 2) de-configuring a highly reliable core into two separate cores; 3) scheduling an application, or a portion thereof, to a highly reliable core responsive to an indication that said application (or application portion) should be executed on a reliable core; and 4) scheduling an application, or portion thereof, to a single unreplicated core responsive to an indication that said application (or application portion) is resilient.

Figure 5:
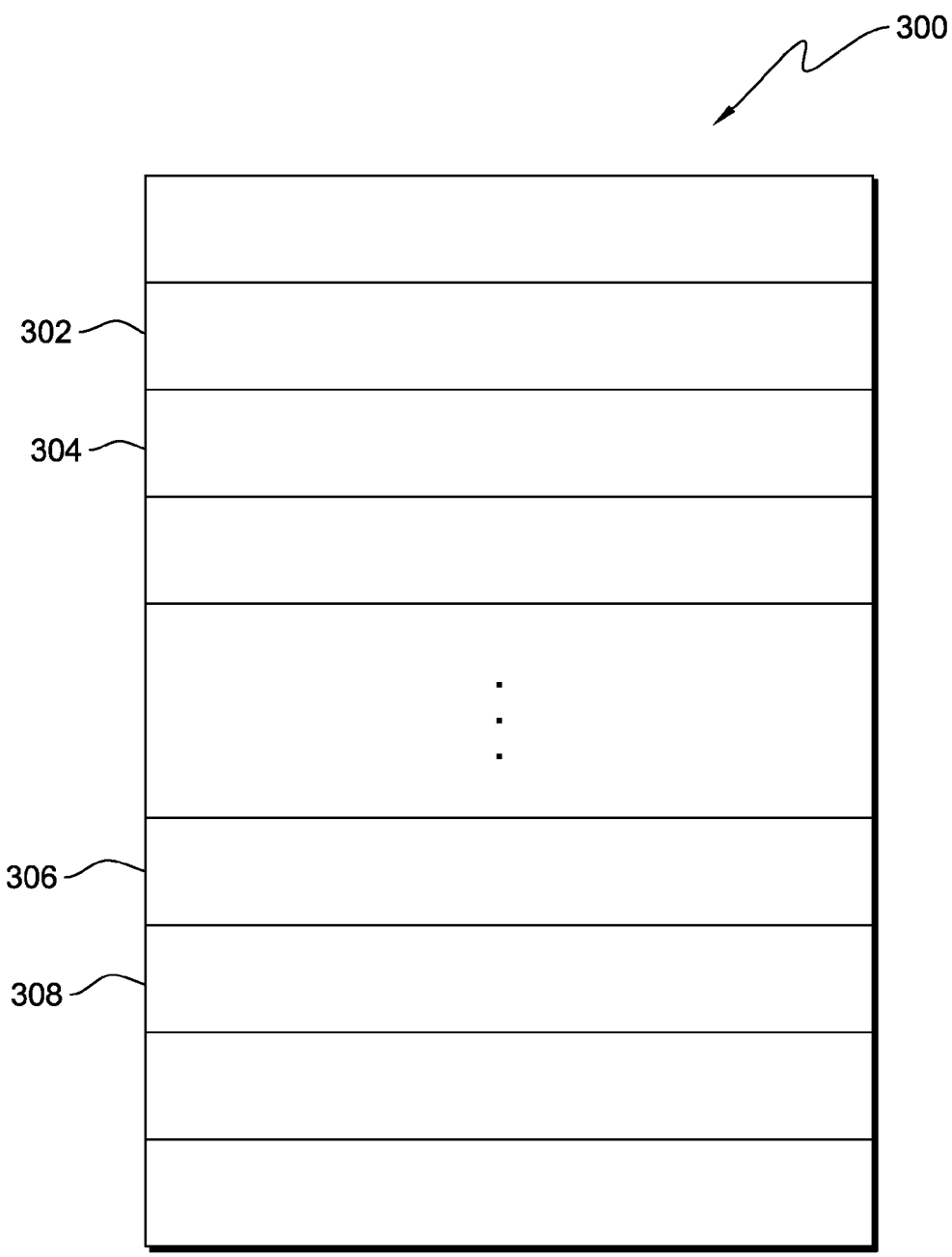
FIG. 5 depicts conceptually an example high performance computing application 300 running on a multiprocessor computing system that employs the selective pairing facility in one embodiment.

FIG. 5 depicts conceptually an example high performance computing application 300 running on a multiprocessor computing system that employs the selective pairing facility in one embodiment. As shown in FIG. 5, in accordance with an exemplary application-configured system, application 300 includes code portions 302, 304, 306, 308. In one embodiment, code portions 304, 308 may include incorporated in the programmed code fault tolerant algorithms that do not require redundant paired cores for high reliability operation. Reliability of the software program is achieved by using a high-reliability algorithm with internal built in checking, for example, by implementing convergence based algorithm. However, within the same program, computing portions 302, 306 may include specific call-outs to configure the system to operate in a high reliability paired mode, i.e., the operating system will implement the switching to pair two processor (hardware) cores as a single highly reliable (virtual) core such that the selected paired cores can run a single thread in the higher reliability mode. In this mode, one processor core will check the results of the other processor core to ensure high reliability. That is, the operating system will populate operation registers at each of the two paired cores for performing the same programmed operations.

Thus, in the exemplary system, a computing application 300 includes a resilient application portion 304, as such based on an iterative convergence algorithm, and a control and calculation logic portion 302 which is less intrinsically resilient. In such an embodiment, the application 300 executes code section 302 by configuring the system with a first (typically, but not necessarily, smaller) number of threads to perform initialization and initial configuration using paired hardware-resilient cores such as depicted in FIG. 4C. The threads of the application are then synchronized, e.g., using a known barrier synchronization method, as known to those skilled in the art, and after the barrier synchronization, the application portion 304 requests a reconfiguration call-out to deconfigure hardware pairing. After hardware pairing has been deconfigured resulting in a system architecture such as depicted in FIG. 4B, the application is dispatched with a second number of threads. In one embodiment, this is a larger number of parallel threads. In another embodiment, the same or fewer threads are scheduled, making additional threads available to other applications, or de-energizing unused threads for power conservation. After parallel computation of the resilient application portion 304, another barrier sync is performed. After barrier synchronization, in code portion 306 there include call-outs to reconfigure the system to use hardware-resilient paired cores is performed, and the less intrinsically resilient application portion 306 is performed.

Figure 6:
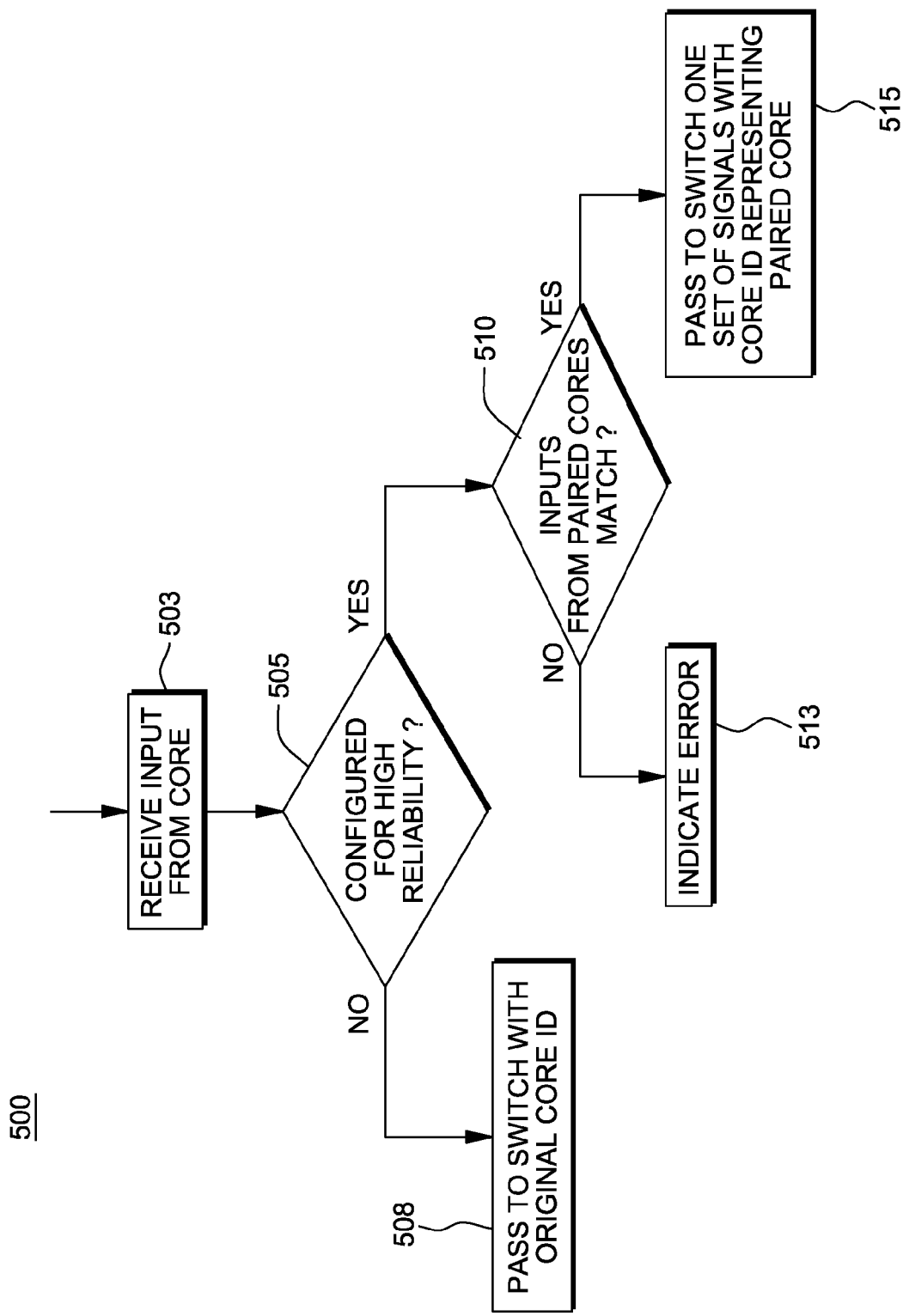
FIG. 6 depicts a methodology 500 employed at the pairing facility with reliability checking in response to receipt of data from a microprocessor according to one embodiment.

FIG. 6 depicts a methodology 500 employed at the pairing facility with reliability checking in response to receipt of data from a microprocessor. At step 503, there is depicted the receipt at the pairing facility of data from a microprocessor core. At 505, a determination is made as to whether the microprocessor core has been configured for paired mode of operation (high reliability). If at 505 it is determined that the microprocessor core has not been configured for paired mode of operation, then the pairing facility is configured according to facility 101a shown in FIG. 4B. Thus, as shown at 508, the original core ID of the processor from which the data is provided is passed to the switch with the data at the pairing facility, for example, such that the data is passed through the facility to a switch or the system "nest", without checking by a paired ("checker") processor.

Otherwise, if at 505, it is determined that the microprocessor core has been configured for high reliability (i.e., paired mode of operation), then the pairing facility is configured according to facility 101a shown in FIG. 4C. In this example, for instance, data comprises processing results sent from processor 12a, for example, received from line 125a (shown in FIG. 4C). However, in this highly reliable mode of operation, as shown at 510, a determination is then made as to whether the inputs from the paired core match. That is, in view of FIG. 4C selective pairing configuration for high reliability, it would be determined by comparator 275 (of FIG. 4C) whether the data comprising processing results of the paired processor device 12b, for example, received at line 125b matches the data received at the facility from processor 12a along line 125a at the pairing facility. If at step 510 it is determined that the data input from its paired core 12b does not match the result data being input from the processor core 12a, then a compare result error is flagged at 513 indicating a potential hardware failure at one of the cores. In this scenario, the error is generated as error signal 280 (FIG. 4C) which is further processed by the configuration logic at the paired facility for further action. In one embodiment, this error initiates an interrupt routine. For example, in one embodiment, it can not be determined which core has an error, only that an error occurred; and since as the correct result is not known, the result is discarded. Otherwise, if at step 510 it is determined that the data input from its paired core 12b does match the result data being input from the processor core 12a, then at 515, one set of signals (e.g., data) is passed through the facility to the switch or the system "nest" with a core ID representing the paired cores.

Figure 7:
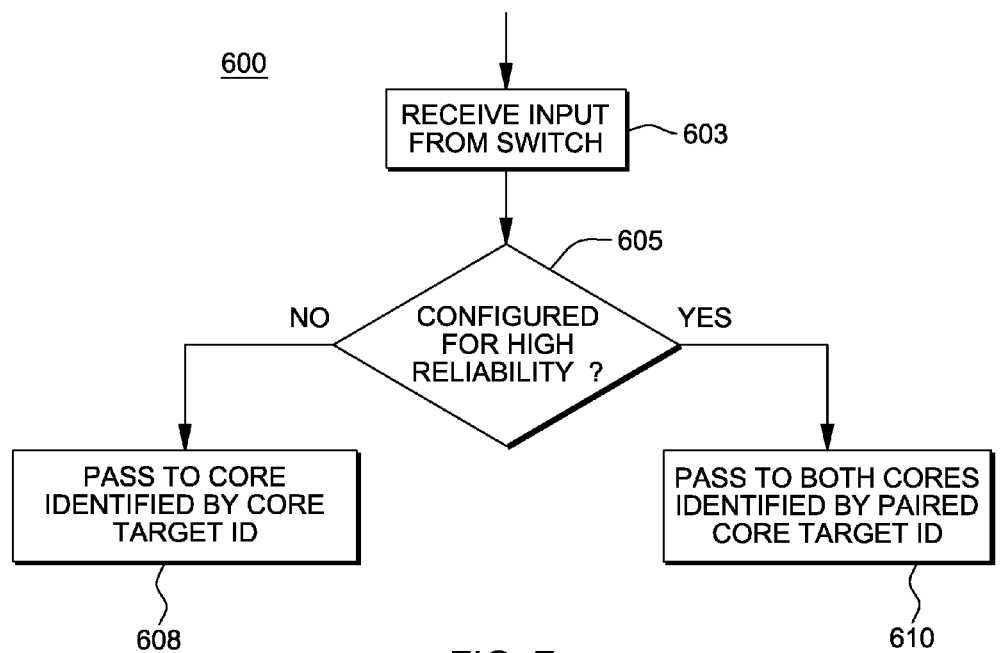
FIG. 7 depicts a methodology 600 employed at the pairing facility with reliability checking in response to receipt of data from the system nest via the switch/bus according to one embodiment.

FIG. 7 depicts a methodology 600 employed at the pairing facility with reliability checking in response to receipt of data from the system nest, e.g., via the switch/bus according to one embodiment. At step 603, there is depicted the receipt at the pairing facility of data from the switch/bus. At 605, a determination is made as to whether the system is configured for highly reliable (paired) mode. If the system is not configured for highly reliable (paired) mode, then the pairing facility is configured according to facility 101a shown in FIG. 4B. In this instance, at 608, the received (input) data from the system "nest" is passed directly to the processor core, e.g., core 12a, identified by the core target ID via signal line 120a for input to processor core 12a. Otherwise, if at 605, it is determined that the microprocessor core has been configured for high reliability (i.e., paired mode of operation), then the pairing facility is configured according to facility 101a shown in FIG. 4C. In this mode of operation, for instance, data received from system "nest", for example, received at line 120a (shown in FIG. 4C) is input to both paired processor cores 12a, 12b identified by a paired core ID. That is, in such an embodiment, as indicated at 610, FIG. 7, control signals are generated to configure the mux element 250 to additionally receive and select (pass through) to paired processor core 12b those received signals received for processor core 12a according to a paired core target ID.

Figure 10:
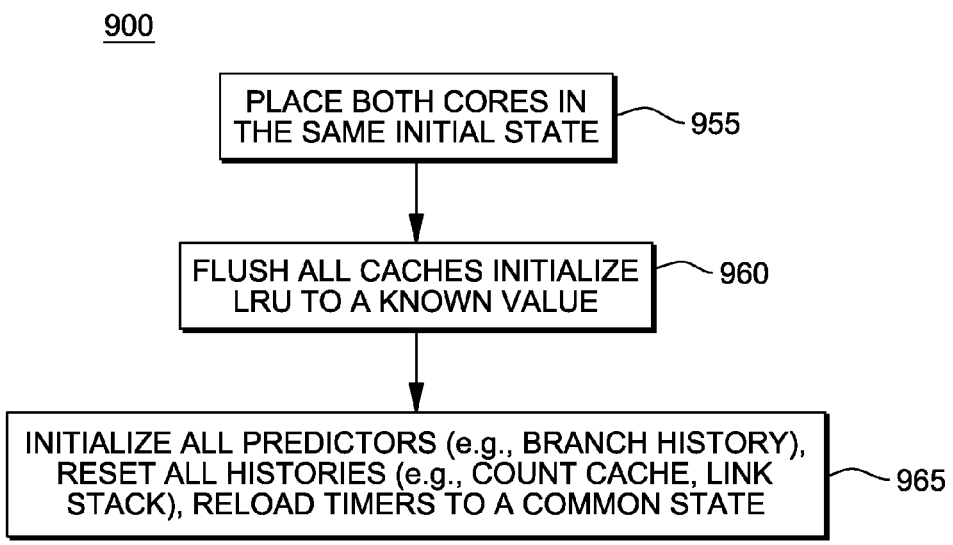
FIG. 10 depicts a method 950 of configuring of the paired cores for a checker/checkee relationship in order to ensure lockstep execution on a cycle-by-cycle basis in one embodiment.

In one embodiment, configuring of the paired cores for a checker/checkee relationship as described herein, requires initialization of both cores in a common microarchitectural state in order to ensure lockstep execution on a cycle-by-cycle basis. In one embodiment, as shown in FIG. 10, a method 950 of rendering the pairing facility and selected paired cores for a checker/checkee relationship include, but not limited to: the following steps: 1) placing both cores in same initial state to have exactly same execution sequence at 955; 2) flushing all cache state and initialize LRU (Least Recently Used) information to a known value at 960; and, 3) initiating, at 965, all predictors to a common state which may include branch history, count cache, link stack, a reset of all histories; a reloading of timers, etc. In one aspect, this initialization for paired core operations can be performed by a code sequence, or microcode, a combination of ABIST and state machines. In one embodiment, ABIST and sate machines are used as advantageously not having side effects (e.g., warming up predictor); and, 4) starting execution at same time, e.g., via a common external exception.

In a further aspect, in the checker/checkee relationship as described herein, if the decision logic device 275 detects in incorrect execution, e.g., the comparison performed by the comparator determines unmatched output results after processing by the paired high-reliable cores, i.e., a lockstep failure, then, in the preferred embodiment the system generates a trigger to initiate processor core rollback to a previous state, and, further reinitialize the cores to perform lockstep execution.

That is, in one embodiment, the overall computing system architecture of FIG. 2 supports a transactional memory storage device or buffer (not shown in the figure) wherein each of the paired processor cores communicate with the memory via atomic load and store operations from and to the memory. In one embodiment, a multi-versioning cache of a multiple processor system may support transactional memory directly in hardware. A sequence of memory operations performed by a processor core in high-reliability mode can be grouped as a "transaction" and guaranteed to either be run atomically by a memory subsystem or reverted in case of a conflict with other memory accesses or transactions. In one transactional memory model, a user may define those regions of code, e.g., through annotations that are to be handled as atomic. The transactional memory is typically used to enable local rollback of state, i.e., the memory system that supports transactions can avoid committing state until commanded to and no previously committed state will be effected. Thus, all transactional memory contents is in a speculative state, e.g., a memory location in a local, e.g., second level (L2), processor cache having committed data previously indicated as good, will not be overwritten, until receipt of a commitment command; and rather is stored in the transactional memory as virtualized data.

Thus, in the system, when a mis-compare is detected after comparing results of both processing cores, there may be no indication of which of the paired cores (if at all) was responsible for the failed result. Thus, the nature of the offending problem is not identified (e.g., soft or hard-type error) and, although an error is known to exist, it is not known when the mis-compare occurred and is only identified until later after subsequent processing when these results would be sent to the system for later use and where a resultant corruption is detected. As such, the transaction has to be aborted, and the transactional memory for storing the state of the processor cores and processing results in a defined transaction "window" should be invalidated. The paired cores are re-set for re-executing code of the transaction by placing each core at a common state which was stored in transactional memory at the beginning of that transaction.

As shown in FIG. 8A, a transaction 700 is depicted in which each of selected paired cores 702a, and 702b perform lock-step execution of a transaction, i.e., programmed process steps possibly involving memory write results, in the high-reliability paired mode of operation, with write outputs being stored (saved) in the transactional memory. Upon determination of a failure, all of the transactional output results obtained during the transaction are invalidated and, the system triggered to rerun the steps of the transaction. That is, the transaction can be used to "rollback" and recover from a fail.

Figure 8B:
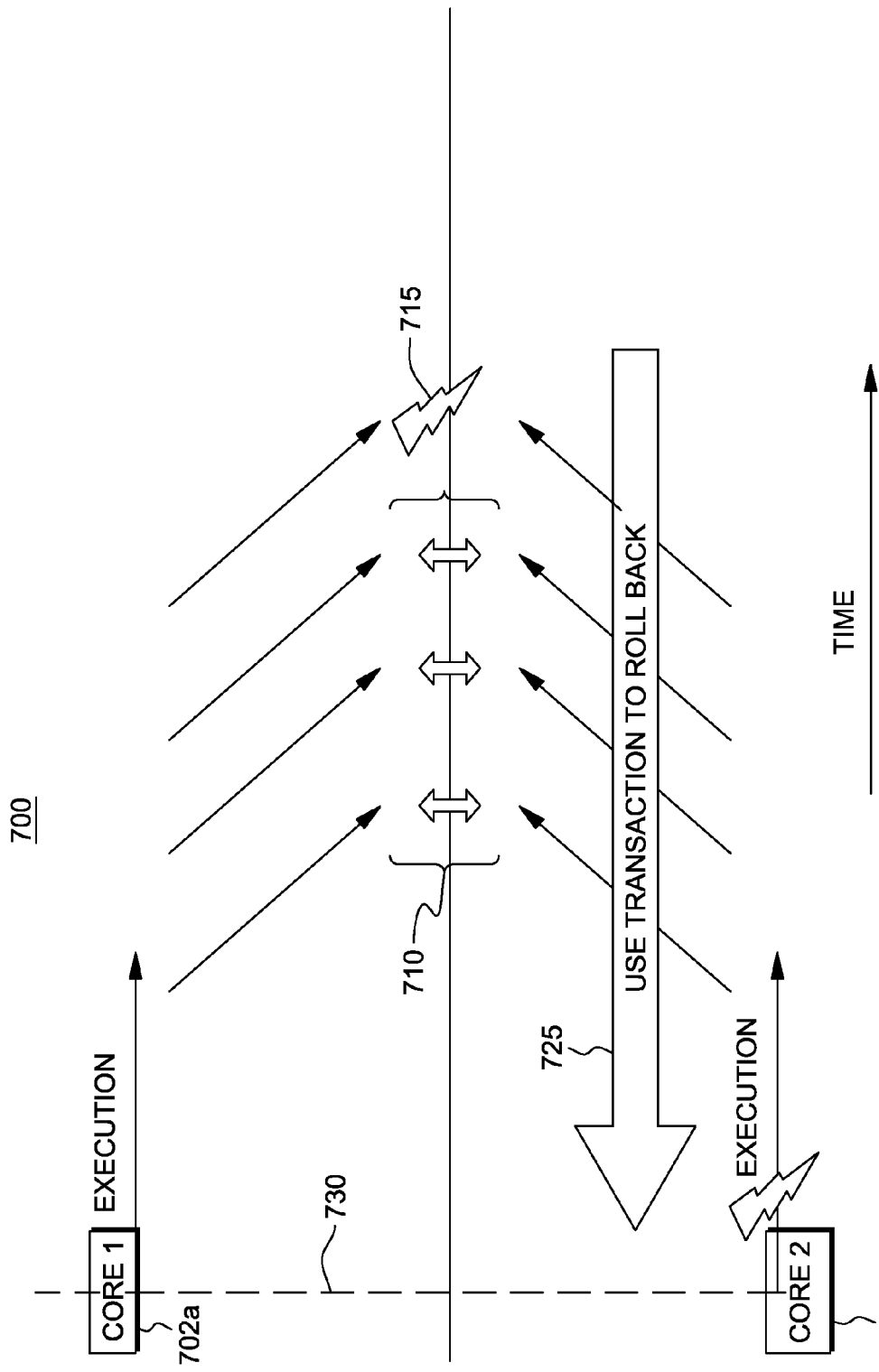
FIG. 8B depicts the transaction of FIG. 8A shown recovering from an error by initiating rollback to invalidate all of the results obtained during the transaction and to re-start operations in the paired mode of operation with each processor core brought to an identical initial transaction state.

Thus, as shown in FIG. 8A the transaction 700 shows the timeline in which each of selected paired cores 702a, and 702b in paired high-reliability mode of execution perform lock-step execution 710 of the programmed transaction process steps, and the outputs are compared as described in greater detail herein. At a detection of a mis-compare at 715, i.e., when the output results of each core do not match, it is not known which core is responsible for the failure, nor when during running of process steps of the transaction did the failure occur. For example, a paired processor core performs a floating point calculation that results in the wrong value which is stored in the processor register. In the meantime the processor performs other activities so the wrong result may not be detected until after the processor has sent results out to the system (outside the core), or used in another calculation and then sent that result outside the core. However, in the paired high-reliability system, the error will be detected, and operating system will receive the error indication of the mis-compare on signal line 280 (FIG. 4C), and, as shown in FIG. 8B, recover by initiating rollback 725 to invalidate all of the results obtained during the transaction and to re-execute, i.e., re-start, that transaction processing again in the paired mode of operation with each processor core 702*a*, 702*b* brought to the identical initial transaction state indicated at 730. Commonly-owned U.S. patent application Ser. No. 12/696,780 entitled LOCAL ROLLBACK FOR FAULT-TOLERANCE IN PARALLEL COMPUTING SYSTEMS [[YOR920090529US1] describes use of transaction including a rollback scheme to recover from a processor fail, and is incorporated by reference as if fully set forth herein.

Figure 9A:
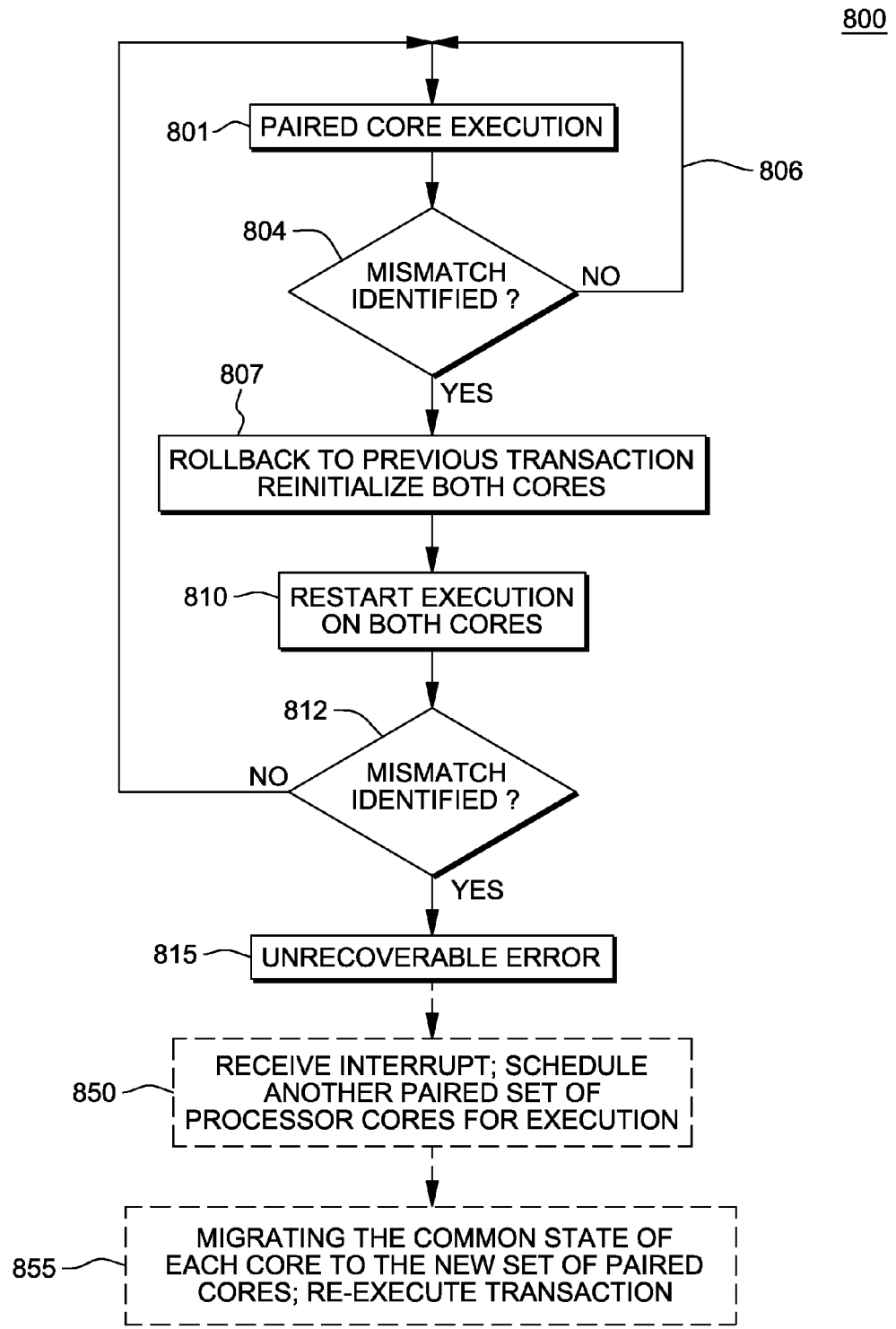
FIG. 9A depicts the methodology 800 that enables processor core rollback to a previous state as shown in FIG. 8B.

FIG. 9A depicts a methodology 800 that enables processor core rollback to a previous state as shown in FIG. 8B, and, further enables re-initialization to perform lockstep execution. In step 801 at least two cores execute in the paired high-reliability execution mode. In step 804, there is performed a check to identify a mismatch in lockstep execution, preferably by decision logic device 275 in the pairing facility. The paired core devices are each configured to loop 806 such that as long as no output mismatch is encountered, the paired processor cores will continue processing the transaction in the paired execution mode. Otherwise, if a mismatch is detected at 804, this detection causes generation of an error signal 280, as shown in FIG. 4C. In one embodiment, this error signal triggers an interrupt signal, received by a controlling processor or a host. In one embodiment, the controlling processor or host triggers a transaction rollback at 807 and a re-initialization of the cores to an identical state. The controlling processor can be another processor performing service functions, or program function executing on one or both or the paired processors 702*a* and 702*b*. Then, at 810, both cores are re-started in paired execution mode to again perform the failed transaction. Continuing at step 812, if it is again determined that the decision logic device 275 in the pairing facility detects a mismatch, as indicated on signal line 280 (FIG. 4C), then at this point, the code is considered to contain an unrecoverable error 815. Otherwise, if at 812, there is no failure when re-executing the transaction code in paired execution mode, then the process continues by returning to step 801.

With respect to case that re-execution of the paired cores for that transaction will still result in generation of an error in 815, i.e., a mis-compare, the code execution on that cores pair is determined as containing an unrecoverable error, e.g., a hard error. Hard errors can occur when core hardware fails either in not storing correctly all bits of data, or producing wrong results for some operations. However, as a result of saving the state of each processor at a start of a transaction, given the nature of the "hard" error, it is advantageous to utilize the saved "good" state of both processor cores and migrating the state to another set of paired processor cores which should be able to alleviate the repeating error. Thus, as further shown in FIG. 9A, upon detection of an unrecoverable error at a first set of paired cores, the pairing facility, utilizing interrupt hardware and/or fault isolation registers that flag the paired cores that generated the error, generates a system interrupt that the OS or controlling process receives and processes. Thus in one optional embodiment, shown in FIG. 9A, in response to receiving the system interrupt, as indicated at 850, the OS or controlling process schedules two new processor cores for paired operation in the manner as set forth herein to run the same code of that transaction. Then, the common micro-architectural state of each of the paired cores that had been stored in transactional memory at a time prior to or at the beginning of the most recent transaction that failed is migrated at 855 to the new set of paired processor cores, which are then lockstep re-executed in paired mode.

Thus, the rollback facility (either implemented as a software program, or supported by hardware elements) attempts to undo the incorrect execution which was detected with lockstep execution, by attempting a re-execution of both processor cores from a time prior to the beginning of the transaction. Thus, the application will continue its execution from the last previously known valid state. In this way, an application makes progress—it is divided into a set of transactions, and each transaction is stored only after it is reliably executed, i.e., after that transaction completed without errors detected. This transaction ensures the state of both cores resulting from processing of the application is correct, and is guaranteeing that no architected state stored in the system memory is corrupted. If the cause of the lockstep failure was a SER (e.g., a soft error), and if a re-execution succeeds, the transaction will complete correctly. Similarly, a number of other transient failed executions may be resolved this way.

In one embodiment, rollback is used by leveraging the rollback capability, such as offered in a TM (transactional memory) or TLS (thread level speculation) system. Transactional memory systems are described in M. Herlihy and J. E. Moss, "Transactional memory: Architectural support for lock-free data structures'", *Proceedings of the 20th International Symposium on Computer Architecture (ISCA)*, pp. 289-300, 1993, and L. Hammond et al., "Transactional memory coherence and consistency", *Proceedings of the 31st annual International Symposium on Computer Architecture (ISCA)*, pp. 102-113, 2004, both of which are incorporated herein by reference Inter alia, Transactional Memory provides the ability to "roll back" (i.e., undo) all updates to the memory subsystem within a transaction when a conflict between multiple updates to a memory location by multiple processors are detected. Transactional Memory can be implemented either in hardware ("Hardware Transactional Memory"), or software ("Software Transactional Memory"), or a combination of both.

In addition to "rolling back" the memory state, transactional execution also requires the architected state of the processor (i.e., the processor registers) to be rolled back. In accordance with implementations of transactional memory execution, a snapshot of the architected processor registers is obtained for storage prior to starting a transaction, and restored when a transaction is restarted. A snapshot of registers can encompass either all architected registers, all user-state architected registers, or a subset thereof. Architected registers correspond to architecture-specified registers, such as those found in the Power ISA specification, "Power ISA™, Version 2.06 Revision B".

Figure 11:
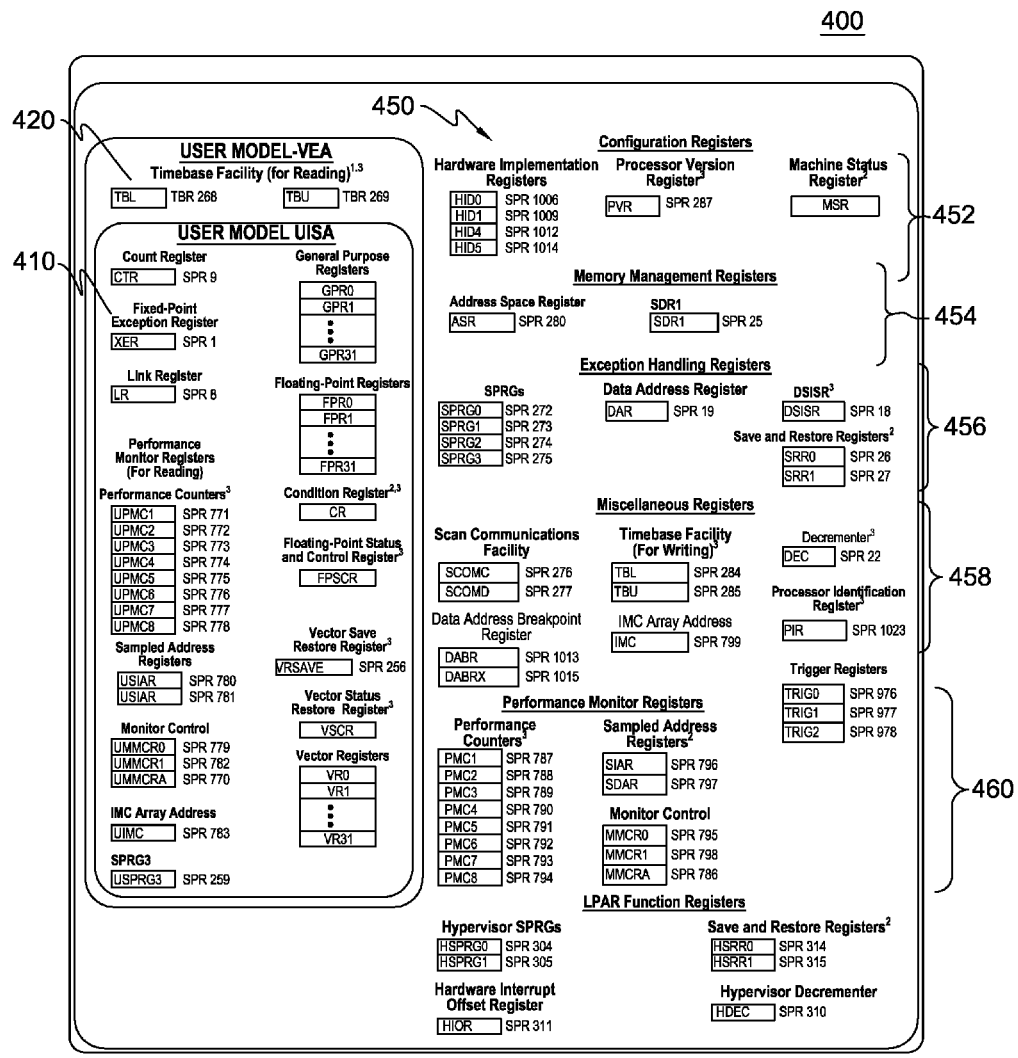
FIG. 11 illustrates an exemplary overview of architected registers of an example implementation of a PowerPC 970FX Microprocessor model subject to transaction snapshot processing.

FIG. 11 shows an exemplary summary overview 400 of architected registers 450 in accordance with an implementation of the Power ISA in an example PPC970FX, as described in "IBM PowerPC 970FX RISC Microprocessor User's Manual" the whole content and disclosure of which is incorporated herein by reference. With reference to FIG. 11, there are shown the architected registers 450 (e.g., configuration registers 452, memory management registers 454, exception handling registers 456, miscellaneous registers 458, performance monitoring registers 460, etc.) implemented in the PPC970FX multiprocessor architecture. In addition, two subsets of user-level architected registers, corresponding to the "User Instruction Set Architecture" (UISA) 410 and the "Virtual Execution Environment" (VEA) 420 are indicated. A snapshot of registers 450 can be generated by hardware as a part of a "start transaction" instruction, or by storing the snapshot of architected registers using a sequence of store instructions prior to starting the transaction. When only a subset of registers is stored, generated code must take care not to require the values of non-restored registers when a transaction is restarted (i.e., these registers should not be "live" across the transaction start instruction with respect to allocation of values to registers). A snapshot of registers can be generated by hardware as a part of a "start transaction" instruction, or by storing the snapshot of architected registers using a sequence of store instructions prior to starting the transaction.

While in prior-art Transactional Memory systems, snapshots of architected registers are generated prior to entering a transaction outside of a transaction, in one optimized embodiment, the system generates an architected register snapshot as part of the prior transaction. Executing the generation of a snapshot as part of a transaction facilitates the detection of any errors which may occur as part of snapshot generation. Storing the snapshot as part of the previous transaction also ensures that no values are live from one transaction to another transaction without having been checked for correct execution by forcing their values to be compared in the selective pairing unit, prior to the end of a transaction, thereby ensuring that no unchecked state carries from one transaction into a second transaction.

In accordance with one embodiment, system 50 includes apparatus implementing transactional memory and executes code employing transactional execution in conjunction with transactional memory in order to provide advantageous error recovery. The code executed by system 50 is prepared by a compiler or programmer adapted to use transactions. In one embodiment, the program code employing transactional execution in conjunction with transactional memory is prepared by compiler or programmer prior to execution on system 50. In another embodiment, the program code employing transactional execution in conjunction with transactional memory is prepared by a compiler executing on processor 12a, . . . , 12n employing dynamic or "just-in-time" (JIT) compilation techniques, e.g., as described in Gschwind et al, "Dynamic and Transparent Binary Translation", IEEE Computer, March 2000 (vol. 33 no. 3), pp. 54-59, incorporated herein by reference. As known, the compiler prepares the program, and is performed independently and prior to the program use in conjunction with a system having the paring facility. The program is stored in the memory that is part of the system components in FIG. 2, et seq. As known, transaction memory systems executes a sequence of instructions as part of a transaction, when synchronization with other threads executing in parallel is necessary. In an improved code generation method in accordance with a further embodiment of the present invention, the compiler is adapted to generate code sequences which ensure that when an error is detected, rollback recovery and execution is effective to recovering from an error. In accordance with this embodiment, the compiler will generate instruction sequences where most or all instructions are executed within the scope of a transaction, such that rollback and restart of such transaction can be used to recover from an incorrect execution.

In yet another optimized embodiment a compiler generates code such that all architected registers carried from a first transaction to a second transaction (i.e., being "live" across transaction boundaries) as part of the first transaction ensures that all results computed within the scoped of a transaction are being checked while a transaction rollback can be used to re-execute the computations associated with an incorrect result, and hence offer the capability to recover from such error.

Like Transactional Memory Systems, Tread-Level Speculation (TLS) systems offer the capability to "roll back" (i.e., undo) all updates to the memory subsystem within a speculative thread. Those skilled in the art will understand that the rollback of groups of memory operations in TLS (i.e., speculative threads) can be used similar to rollback groups of memory operations in Transactional Memory (i.e., transactions) to undo a set of memory updates when an error has been detected. Thread-Level Speculation is described in L. Hammond et al., "The Stanford Hydra CMP", IEEE MICRO Magazine, March-April 2000, and incorporated herein by reference. While exemplary embodiments will be discussed with reference to the use of transactional memory systems, those skilled in the art will understand that the teachings contained herein can be practiced in conjunction with TLS systems.

Figure 9B:
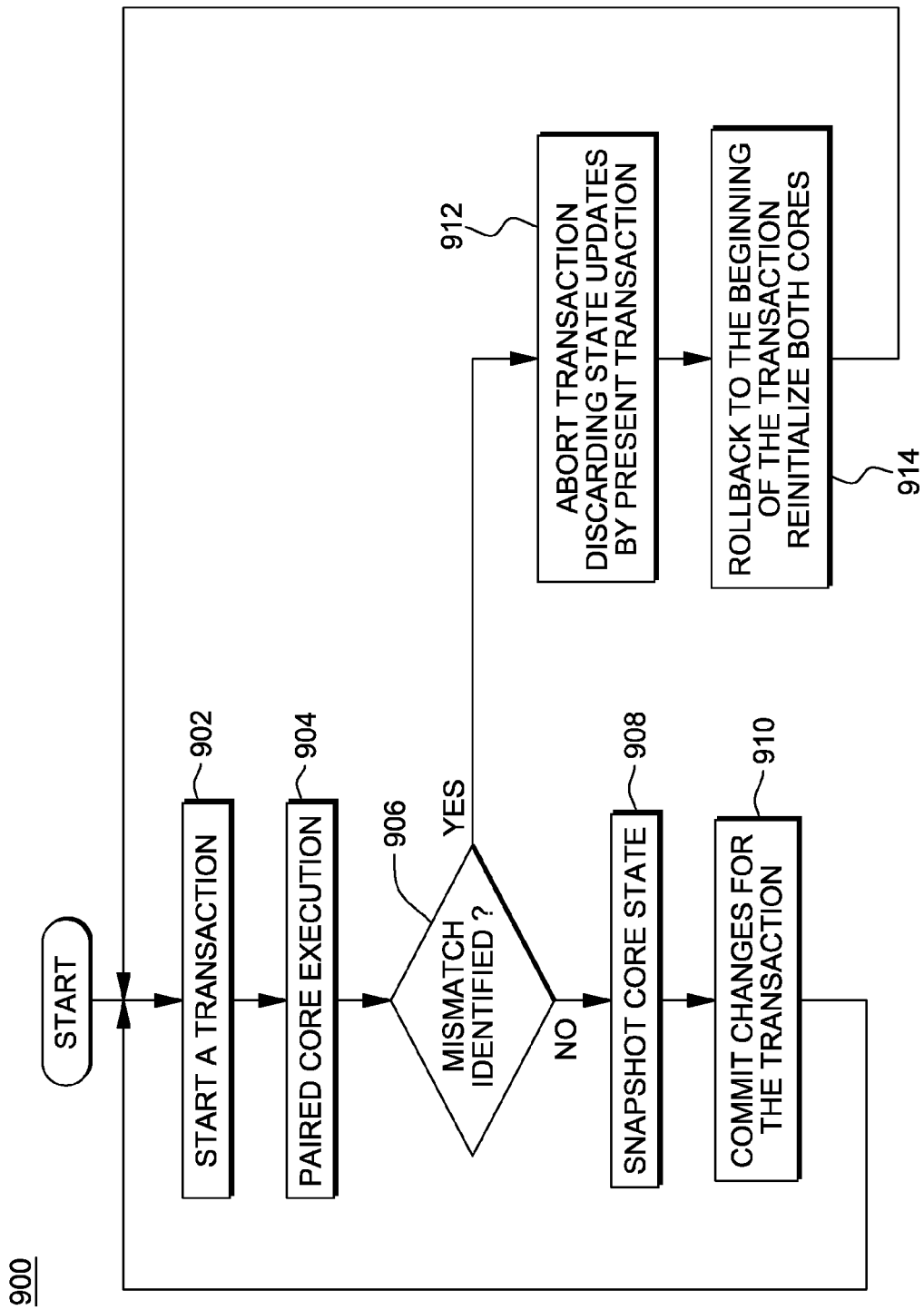
FIG. 9B depicts the methodology 900 that enables processor core rollback to a previous state and to store a processor snapshot.

Referring now to FIG. 9B, there is shown method 900 for the generation of a snapshots of architected registers in a transaction in conjunction with paired execution. The method is performed by code generated for execution in a highly reliable thread on the at least two paired processor cores 12a and 12b when selective pairing has been enabled. The method starts with step 902.

In step 902, a transaction is started. In step 904, paired core execution occurs, and the pairing facility compares results to identify if execution mismatch occurs, indicating erroneous execution on at least one processor core.

In step 906, a check is performed if a mismatch between the execution of code for the highly reliable thread has occurred by comparing the result generated by the at least two paired processor cores 12a and 12b. In at least one embodiment, comparison is performed by comparison logic 275. When no mismatch is identified, the method continues in step 908. If a paired execution mismatch is identified, execution continues with step 912.

In step 908, no mismatch has been identified during the execution of the method. A new snapshot of architected registers is generated. Those skilled in the art will understand that generating a snapshot of architected registers for use by transaction rollback (step 914 to restart a transaction of the present method 900, or as step 807 to restart the transaction or step 850 to handle an unrecoverable error in accordance with the method 800).

In step 910, the changes made by the transaction are committed to the system state and the transaction concludes. Control transfers to step 902 to start the next transaction.

In step 912, an execution mismatch between the at least two paired cores has been detected. The method discards the updates to the system by aborting the transaction.

In step 914, execution is rolled back to the beginning of the transaction, by reloading the architected state corresponding to the beginning of the transaction. The cores are re-initialized to ensure lockstep execution.

Those skilled in the art will understand that check 906 is preferably performed in parallel to execution in accordance with steps 904 and 908, indicating any mismatches both during application code execution and during the generation of snapshots with architected registers.

Those skilled in the art will also understand that additional instructions which are not part of a transaction can be executed between step 910 and step 902.

Those skilled in the art will understand that in accordance with this invention, a transaction can be retried multiple times before an unrecoverable error is identified, e.g., to address environments with high soft error rates.

With respect to re-initialization of the processor cores, both cores are configured to be placed in same initial state to have exactly same execution sequence. In this embodiment, a re-initialization facility is provided to ensure a common execution starting point to reinitialize successful lockstep execution. The reinitialization facility can be implemented completely as a software program, as a hardware support logic, or as some combination of these. After lockstep failure, it is quite likely that different contents may be present in caches, branch predictors, branch histories, etc. of the paired cores. Thus, even if both cores execute the same code in the future, their behavior will be different on a cycle by cycle basis, and thereby will fail future lockstep execution. Thus, the re-initialization facility recreates a common defined state. In accordance with a preferred embodiment of the re-initialization facility, caches, branch predictors, branch histories, LRU information and other micro-architectural state is initialized to a known value. Thus, as described hereinabove, in one embodiment, configuring of the paired cores for a paired execution mode with transaction code checker/checkee relationship requires initialization of both cores in a common micro-architectural state in order to ensure lockstep execution on a cycle-by-cycle basis.

Those skilled in the art will understand that sophisticated comparison logic may transcend the requirements of cycle by cycle lockstep execution in at least one alternate embodiment in accordance with the present invention.

Figure 12:
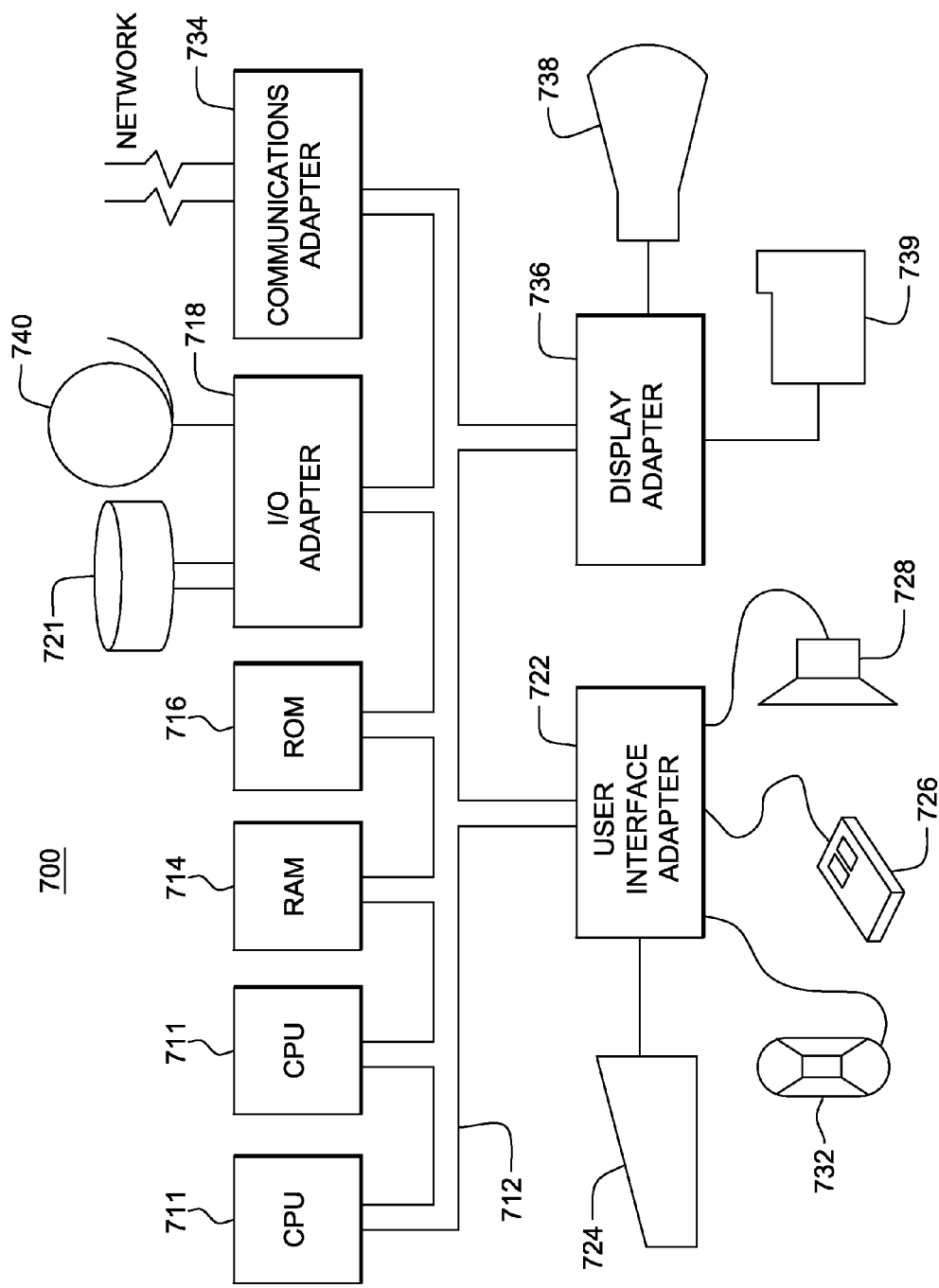
FIG. 12 illustrates an exemplary hardware configuration for implementing the flow charts depicted in FIGS. 7-10 in one embodiment.

FIG. 12 illustrates an exemplary hardware configuration of a computing system 700 in which the present invention may be implemented. The hardware configuration preferably has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting the system 700 to a data processing network, the Internet, an Intranet, a local area network (LAN), etc., and a display adapter 736 for connecting the bus 712 to a display device 738 and/or printer 739 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described our invention, what we claim as new, and desire to secure by Letters Patent is:

1. A multiprocessing computer system comprising:
   a transactional memory system including a memory storage device;
   a plurality of processor cores in communication with said transactional memory system;
   a pairing sub-system adapted to dynamically pair two of said plurality of processor cores for fault tolerant operations of a current transaction in response to receipt of configuration information signals, said pairing sub-system providing a common signal path for forwarding identical input data signals to each said paired two processor cores for simultaneous pairwise processing thereat, said pairwise processing performing a lock-step execution of said transaction,
   said transactional memory storage device adapted to store error-free transaction state information used in configuring each paired core at said pairing sub-system for said simultaneous pairwise processing;
   decision logic device, in said pairing sub-system, for receiving transaction output results of each said paired two processor cores and comparing respective output results, said decision logic device generating an error-free indication signal upon determining matching transaction output results of said paired two processor cores when performing said lock-step execution,
   a control processor device, responsive to said error-free indication signal, for updating said transactional memory storage device with transaction state information associated with a most recent error-free transaction,
   said decision logic device further generating an error indication signal upon detection of non-matching transaction output results of said paired two processor cores when performing said lock-step execution,
   said control processor device, in response to said generated error indication signal, invalidating said output results obtained during performing the transaction,
   initiating a paired two processor core rollback to said most-recent error-free transaction state,
   reinitializing each said paired process core in a common microarchitectural state to ensure said lockstep execution on a cycle-by-cycle basis; and
   restarting said simultaneous pairwise transaction processing and initiating ensuring simultaneous lockstep execution.

2. The multiprocessing system as claimed in claim 1 wherein said decision logic device generates an error indication signal upon detection of non-matching transaction output results of said paired two processor cores when performing said lock-step execution,
   said control processor device, in response to said generated error indication signal, aborting said transaction.

3. The multiprocessing system as in claim 1 wherein said configuring each of said paired cores in a common microarchitectural state includes flushing all cache states; resetting of predictor histories and predictor areas; and, initializing timers.

4. The multiprocessing system as in claim 1 wherein a first simultaneous pairwise execution of said transaction at a first pairing sub-system results in generating a first error indication signal; and, a restarted simultaneous pairwise execution of said transaction at said first pairing sub-system results in generating a second error indication signal, wherein, in response to generating two successive error indication signals at said first said pairing sub-system, said system migrating said simultaneous lockstep execution to a second pairing sub-system, said migrating including configuring two cores of said second pairing sub-system in a common microarchitectural state corresponding to said previous error-free transaction state.

5. The multiprocessing system as in claim 1 wherein said transaction state information further comprises a snapshot of register values of all or a sub-set of registers associated with each processor core, said system generating an architected register snapshot as part of processing each transaction, said architected register snapshot obtained for storage in said transactional memory system prior to starting a transaction, and restored when a transaction is restarted.

6. A method for performing highly-reliable fault tolerant operations in a multiprocessing computing system including a plurality of processor cores in communication with a memory system, said method comprising:
   dynamically configuring a pairing sub-system to pair two of said plurality of processor cores for fault tolerant operations of a current transaction in response to receipt of configuration information signals, said pairing sub-system providing a common signal path for forwarding identical input data signals to each said paired two processor cores for simultaneous pairwise processing thereat, said pairwise processing including performing a lock-step execution of said transaction,
   storing, in a transactional memory system including a memory storage device, error-free transaction state information used in configuring each paired core said pairing sub-system for said simultaneous pairwise processing;

receiving, at a decision logic device in said pairing subsystem, transaction output results of each said paired two processor cores;

comparing respective transaction output results, generating, by said decision logic device, an error-free indication signal upon determining matching transaction output results of said paired two processor cores when performing said lock-step execution; and, updating, responsive to receipt of said error-free indication signal, said transactional memory storage device with transaction state information associated with a most-recent error-free transaction, generating, by said decision logic device, an error indication signal upon detection of non-matching transaction output results of said paired two processor cores when performing said lock-step execution, and in response, invalidating said output results obtained during performing the transaction, initiating a paired two processor core rollback to said most-recent error-free transaction state, reinitializing each said paired process core in a common microarchitectural state to ensure said lockstep execution on a cycle-by-cycle basis; and restarting said simultaneous pairwise transaction processing and initiating ensuring simultaneous lockstep execution.

7. The method as claimed in claim 6 further comprising:

generating, by said decision logic device, an error indication signal upon detection of non-matching transaction output results of said paired two processor cores when performing said lock-step execution; and, aborting, in response to said generated error indication signal, said transaction.

8. The method as in claim 6 wherein said configuring each of said paired cores in a common microarchitectural state includes flushing all cache states; resetting of predictor histories and predictor areas; and, initializing timers.

9. The method as in claim 6 generating a first error indication signal resulted from a first simultaneous pairwise execution of said transaction at a first pairing sub-system; and, generating a second error indication signal resulted from a restarted simultaneous pairwise execution of said transaction at said first pairing sub-system, wherein, in response to generating two successive error indication signals at said first said pairing sub-system, migrating said simultaneous lockstep execution to a second pairing sub-system, said migrating including configuring two cores of said second pairing sub-system in a common microarchitectural state corresponding to said previous error-free transaction state.

10. The method as in claim 6 wherein said transaction state information further comprises a snapshot data of register values of all or a sub-set of registers associated with each processor core, said method comprising:

generating an architected register snapshot data as part of processing each transaction, wherein, prior to starting a transaction, storing in said transactional memory system, said architected register snapshot data; and, restoring said architected register snapshot data from said transactional memory system when a transaction is restarted.

11. A computer program product for performing highly-reliable fault tolerant operations in a multiprocessing computing system including a plurality of processor cores in communication with a memory system, the computer program device comprising a storage medium readable by a processing circuit and storing instructions run by the processing circuit for performing a method, the method comprising:

dynamically configuring a pairing sub-system to pair two of said plurality of processor cores for fault tolerant operations of a current transaction in response to receipt of configuration information signals, said pairing sub-system providing a common signal path for forwarding identical input data signals to each said paired two processor cores for simultaneous pairwise processing thereat, said pairwise processing including performing a lock-step execution of said transaction, storing, in a transactional memory system including a memory storage device, error-free transaction state information used in configuring each paired core said pairing sub-system for said simultaneous pairwise processing;

receiving, at a decision logic device in said pairing sub-system, transaction output results of each said paired two processor cores;

comparing respective transaction output results, generating, by said decision logic device, an error-free indication signal upon determining matching transaction output results of said paired two processor cores when performing said lock-step execution, updating, responsive to receipt of said error-free indication signal, said transactional memory storage device with transaction state information associated with a most-recent error-free transaction, generating, by said decision logic device, an error indication signal upon detection of non-matching transaction output results of said paired two processor cores when performing said lock-step execution, and in response, invalidating said output results obtained during performing the transaction, initiating a paired two processor core rollback to said most-recent error-free transaction state, reinitializing each said paired process core in a common microarchitectural state to ensure said lockstep execution on a cycle-by-cycle basis; and restarting said simultaneous pairwise transaction processing and initiating ensuring simultaneous lockstep execution.

12. The multiprocessing system as in claim 1, wherein a processor core runs an application having a first code portion with an indicator for configuring a pairing sub-system to dynamically pair that processor core with another processor core for independent parallel operation at said pairing sub-system; and, said application having a second code portion with an indicator to configure said pairing sub-system to dynamically pair that processor core with another processor core of said plurality of processor cores for said fault tolerant operations in said lock-step execution at said pairing sub-system.

13. The method as in claim 6, further comprising: running a software application on a processor core in said multiprocessing system, said application including a first code portion with an indicator for configuring a pairing sub-system to dynamically pair that processor core with another processor core of said plurality of processors for independent parallel operation at said pairing sub-system; and said application having a second code portion with an indicator for configuring said pairing sub-system to dynamically pair that processor core with another processor core of said plurality of processor cores for said fault tolerant operations in said lock-step execution at said pairing sub-system.

* * * * *